US007193006B2

(12) United States Patent
Ishizaki et al.

(10) Patent No.: US 7,193,006 B2
(45) Date of Patent: Mar. 20, 2007

(54) PROCESS FOR CONTINUOUS PRODUCTION OF WATER-ABSORBENT RESIN PRODUCT

(75) Inventors: Kunihiko Ishizaki, Suita (JP); Katsuhiro Kajikawa, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 210 days.

(21) Appl. No.: 10/724,895

(22) Filed: Dec. 2, 2003

(65) Prior Publication Data
US 2004/0110006 A1 Jun. 10, 2004

(30) Foreign Application Priority Data
Dec. 6, 2002 (JP) ............... 2002-355679

(51) Int. Cl.
C08J 3/02 (2006.01)
(52) U.S. Cl. .............. 524/500; 524/501; 524/502; 525/41; 528/480; 528/502 R
(58) Field of Classification Search ........... 524/500, 524/501, 502; 525/41; 528/480, 502 R
See application file for complete search history.

(56) References Cited

U.S. PATENT DOCUMENTS

| 4,093,776 | A | 6/1978 | Aoki et al. |
| 4,286,082 | A | 8/1981 | Tsubakimoto et al. |
| 4,367,323 | A | 1/1983 | Kitamura et al. |
| 4,446,261 | A | 5/1984 | Yamasaki et al. |
| 4,625,001 | A | 11/1986 | Tsubakimoto et al. |
| 4,683,274 | A | 7/1987 | Nakamura et al. |
| RE32,649 | E | 4/1988 | Brandt et al. |
| 4,873,299 | A | 10/1989 | Nowakowsky et al. |
| 4,973,632 | A | 11/1990 | Nagasuna et al. |
| 4,985,518 | A | 1/1991 | Alexander et al. |
| 5,051,259 | A | 9/1991 | Olsen et al. |
| 5,124,416 | A | 6/1992 | Haruna et al. |
| 5,140,076 | A | 8/1992 | Hatsuda et al. |
| 5,145,906 | A | 9/1992 | Chambers et al. |
| 5,147,343 | A | 9/1992 | Kellenberger |
| 5,149,335 | A | 9/1992 | Kellenberger et al. |
| 5,244,735 | A | 9/1993 | Kimura et al. |
| 5,250,640 | A | 10/1993 | Irie et al. |
| 5,264,495 | A | 11/1993 | Irie et al. |
| 5,380,808 | A | 1/1995 | Sumiya et al. |
| 5,385,983 | A | 1/1995 | Graham |
| 5,409,771 | A | 4/1995 | Dahmen et al. |
| 5,419,956 | A | 5/1995 | Roe |
| 5,453,323 | A | 9/1995 | Chambers et al. |
| 5,462,972 | A | 10/1995 | Smith et al. |
| 5,468,813 | A * | 11/1995 | Uenaka et al. .............. 525/385 |
| 5,562,646 | A | 10/1996 | Goldman et al. |
| 5,597,873 | A | 1/1997 | Chambers et al. |
| 5,601,452 | A | 2/1997 | Ruffa |
| 5,610,220 | A | 3/1997 | Klimmek et al. |
| 5,633,316 | A | 5/1997 | Gartner et al. |
| 5,669,894 | A | 9/1997 | Goldman et al. |
| 5,674,633 | A | 10/1997 | Saunders et al. |
| 5,797,893 | A | 8/1998 | Wada et al. |
| 5,994,440 | A | 11/1999 | Staples et al. |
| 6,087,002 | A | 7/2000 | Kimura et al. |
| 6,107,385 | A * | 8/2000 | Imahashi ............... 524/414 |
| 6,127,454 | A | 10/2000 | Wada et al. |
| 6,150,582 | A | 11/2000 | Wada et al. |
| RE37,021 | E | 1/2001 | Aida |
| 6,184,433 | B1 | 2/2001 | Harada et al. |
| 6,194,531 | B1 | 2/2001 | Hatsuda et al. |
| 6,228,930 | B1 | 5/2001 | Dairoku et al. |
| 6,297,335 | B1 | 10/2001 | Funk et al. |
| 6,414,214 | B1 | 7/2002 | Engelhardt et al. |
| 6,444,744 | B1 | 9/2002 | Fujimaru et al. |
| 6,586,549 | B1 | 7/2003 | Hatsuda et al. |

FOREIGN PATENT DOCUMENTS

| CN | 1201041 A | 12/1998 |
| CN | 1281869 A | 1/2001 |
| CN | 1383446 A | 12/2002 |

(Continued)

Primary Examiner—James J. Seidleck
Assistant Examiner—Olga Asinovsky
(74) Attorney, Agent, or Firm—Roylance, Abrams, Berdo & Goodman, L.L.P.

(57) ABSTRACT

There is disclosed a process for continuous production of a water-absorbent resin product by which the water-absorbent resin product having high properties can continuously be produced easily and inexpensively with stable constant quality. In addition, there is disclosed a water-absorbent resin product having high properties and being stable in quality. The process comprises the following steps of: (A) measuring a water-absorbent resin by its predetermined property and/or its predetermined component content, wherein the water-absorbent resin comes being continuously produced via a classification step and/or a surface-modifying step; (B) separating a predetermined amount of water-absorbent resin (a) from the water-absorbent resin that comes being continuously produced, wherein the water-absorbent resin (a) is a water-absorbent resin which displays not less than a definite value and/or a water-absorbent resin which displays not more than a definite value as to the predetermined property and/or the predetermined component content in accordance with results of the aforementioned measurement; and (C) mixing at least a portion of the aforementioned separated predetermined amount of water-absorbent resin (a) into a water-absorbent resin that comes being continuously produced via a classification step and/or a surface-modifying step on the same or another production line.

15 Claims, 1 Drawing Sheet

FOREIGN PATENT DOCUMENTS

| | | |
|---|---|---|
| EP | 049 240 | 1/1990 |
| EP | 0 450 923 A2 | 10/1991 |
| EP | 0 450 924 A2 | 10/1991 |
| EP | 0 532 002 A1 | 3/1993 |
| EP | 0 605 150 | 7/1994 |
| EP | 0 605 215 A1 | 7/1994 |
| EP | 0 629 441 A1 | 12/1994 |
| EP | 0 668 080 A2 | 8/1995 |
| EP | 0 707 603 B1 | 4/1996 |
| EP | 0 712 659 A1 | 5/1996 |
| EP | 0 811 636 A1 | 12/1997 |
| EP | 0 812 873 A1 | 12/1997 |
| EP | 0 885 917 | 12/1998 |
| EP | 0 922 717 A1 | 6/1999 |
| EP | 0 937 739 A2 | 8/1999 |
| EP | 0 940 148 A1 | 9/1999 |
| EP | 0 942 014 A2 | 9/1999 |
| EP | 0 955 086 A2 | 11/1999 |
| EP | 1 029 886 A2 | 8/2000 |
| EP | 1 108 745 A1 | 6/2001 |
| EP | 1 130 045 | 9/2001 |
| EP | 1 153 656 A2 | 11/2001 |
| GB | 2 267 094 | 11/1993 |
| JP | 11-349625 | 12/1999 |
| WO | WO 99/42494 | 8/1999 |
| WO | WO 99/42496 | 8/1999 |
| WO | WO 99/43720 | 9/1999 |
| WO | WO 01/16197 A1 | 3/2001 |
| WO | WO 01/83620 A1 | 11/2001 |
| WO | WO 02/053198 A1 | 7/2002 |
| WO | WO 02/100451 A2 | 12/2002 |

* cited by examiner

PROCESS FOR CONTINUOUS PRODUCTION OF WATER-ABSORBENT RESIN PRODUCT

BACKGROUND OF THE INVENTION

A. Technical Field

The present invention relates to a continuous production process which is a process for continuous production of a water-absorbent resin product having high properties and, specifically, the invention relates to the continuous production process by which the water-absorbent resin product having the high properties can be obtained easily and inexpensively with stable constant quality. In addition, the present invention relates to a water-absorbent resin product having high properties and being stable in quality.

B. Background Art

In recent years, water-absorbent resins are widely used for sanitary materials such as disposable diapers, sanitary napkins, and so-called incontinent pads as their component materials for the purpose of causing the water-absorbent resins to absorb body fluids. Known examples of the water-absorbent resins include: partially-neutralized and crosslinked poly(acrylic acids); hydrolyzed graft polymers of starch-acrylic acid; saponified copolymers of vinyl acetate-acrylic acid ester; hydrolyzed copolymers of acrylonitrile or acrylamide, or crosslinked polymers of these hydrolyzed copolymers; and crosslinked polymers of cationic monomers.

Such water-absorbent resins are required to have properties excellent in such as: liquid absorption quantity and water absorption rate when contacting with aqueous liquids (e.g. body fluids); gel strength; gel liquid permeability; and suction force to suck up water from aqueous-liquid-containing base materials. Furthermore, in recent years, water-absorbent resin powders having very narrow particle diameter distributions and water-absorbent resin powders of which the absorption capacities are high and the water-extractable-component contents are low are demanded, and it is essentially being demanded that such as absorption capacity under load and liquid permeability under load should be high.

Many parameters and measurement methods which define the properties of these water-absorbent resins are disclosed in such as the below-mentioned patent documents.

For example, water-absorbent resins excellent in the gel strength, the extractable component content, and the water absorption capacity are proposed (e.g. refer to Reissued U.S. Pat. No. Re 32649 below). In addition, water-absorbent resins excellent in the liquid permeability without load, the water absorption rate, and the water absorption capacity are proposed (e.g. refer to GB 2267094 below). Furthermore, arts in which specific particle diameter distributions are defined are also proposed (e.g. refer to U.S. Pat. No. 6,087,002 below, and besides, such as U.S. Pat. Nos. 5,051,259, 5,419,956, and EP 0629441).

In addition, many water-absorbent resins excellent in water absorption capacities under various loads and their measurement methods are also proposed, and water-absorbent resins which are defined by their water absorption capacities under load alone or in their combinations with other properties are proposed (e.g. refer to U.S. Pat. No. 6,297,335 below, and besides, such as EP 0707603, EP 0712659, EP 1029886, U.S. Pat. Nos. 5,462,972, 5,453,323, 5,797,893, 6,127,454, 6,184,433, and reissued U.S. Pat. No. Re 37021).

In addition, water-absorbent resins excellent in the impact resistance are proposed (e.g. refer to U.S. Pat. No. 6,414,214 below, and besides, such as U.S. Pat. No. 5,140,076). Furthermore, water-absorbent resins of which the dust contents are defined are proposed (e.g. refer to U.S. Pat. No. 5,994,440 below), and water-absorbent resins of little color are proposed (e.g. refer to U.S. Pat. No. 6,444,744 below). Water-absorbent resins excellent in the gel durability against such as aqueous L-ascorbic acid solution as to the urine resistance and excellent in the water absorbency are proposed (e.g. refer to U.S. Pat. No. 6,194,531 below, and besides, such as EP 0940148). Water-absorbent resins excellent in the gas permeability are proposed (e.g. refer to EP 1153656 below). In addition, water-absorbent resins of which the residual monomer contents are low are proposed (e.g. refer to EP 0605215 below).

Furthermore, it is proposed that water-absorbent resins having specific properties are favorable for water-absorbent articles (diapers) having specific properties, specific constitutions, or specific polymer concentrations (e.g. refer to U.S. Pat. No. 6,150,582 below, and besides, such as U.S. Pat. Nos. 5,147,343, 5,149,335, EP 0532002, U.S. Pat. Nos. 5,601,452, 5,562,646, 5,669,894, and international publication WO 02/053198).

In recent years, as the production of water-absorbent resins increases, the steps (e.g. polymerization, surface treatment) for their production are increasingly made continuous (e.g. refer to EP 0937739 below). In the case where water-absorbent resins are continuously produced, all the produced water-absorbent resins are desired to have the same high properties. However, actually, there may occur dispersions in properties between such as lots of the continuously produced water-absorbent resins, because water-absorbent resins having much more or much less than aimed properties may mingle as impure components (e.g. refer to: International Publication Pamphlet No. 2002/10451; and JP-A-349625/1999). In addition, as demanded properties become higher, or as the production process made continuous becomes longer, or as the production scale becomes larger, slight dispersions in properties in the steps give great dispersions to properties of final water-absorbent resin products. In addition, the below-mentioned surface-crosslinking, particularly, dehydration esterification, also exercises influence on dispersions in properties between final water-absorbent resin products. In addition, if attempts are made to suppress such dispersions in properties, then such attempts have hitherto often involved the deterioration in the productivity. Furthermore, various kinds of water-absorbent resins which meet users' requirements are demanded. As a result, there have been problems such that the production process becomes complicated.

In recent years, in sanitary materials for absorption of excrement, urine, or blood (another name: absorbent articles) which are represented by disposable diapers, there is increasing the concentration of the water-absorbent resin (amount of the water-absorbent resin as used). Therefore, there have been problems such that it takes a long time to stabilize the properties when the product number (type) is changed, and further that slight dispersions in properties of such water-absorbent resin products exercise great influence on final water-absorbent articles.

SUMMARY OF THE INVENTION

A. Objects of the Invention

Thus, an object of the present invention is to provide a process for continuous production of a water-absorbent resin product stable in quality by which the water-absorbent resin product having high properties can continuously be produced easily and inexpensively with stable constant quality. In addition, another object of the present invention is to provide a water-absorbent resin product having high properties and being stable in quality.

B. Disclosure of the Invention

The present inventors diligently studied to solve the above problems. As a result, they have completed the present invention by finding out that it will do if the final product is produced by a process in which: a water-absorbent resin, as comes being continuously produced via a classification step and/or a surface-modifying step, is measured by its predetermined property and/or its predetermined component content (e.g. absorption capacity without load, absorption capacity under load, liquid permeability, particle diameters), and then a water-absorbent resin that displays not less than a definite value and/or a water-absorbent resin that displays not more than a definite value as to the predetermined property and/or the predetermined component content is separated and then mixed with a water-absorbent resin that comes being continuously produced via a classification step and/or a surface-modifying step on the same or another production line.

That is to say, a process according to the present invention for continuous production of a water-absorbent resin product comprises the following steps of: (A) measuring a water-absorbent resin by its predetermined property and/or its predetermined component content, wherein the water-absorbent resin comes being continuously produced via a classification step and/or a surface-modifying step; (B) separating a predetermined amount of water-absorbent resin (a) from the water-absorbent resin that comes being continuously produced, wherein the water-absorbent resin (a) is a water-absorbent resin which displays not less than a definite value and/or a water-absorbent resin which displays not more than a definite value as to the predetermined property and/or the predetermined component content in accordance with results of the aforementioned measurement; and (C) mixing at least a portion of the aforementioned separated predetermined amount of water-absorbent resin (a) into a water-absorbent resin that comes being continuously produced via a classification step and/or a surface-modifying step on the same or another production line.

In addition, another process according to the present invention for continuous production of a water-absorbent resin product comprises a step (A) of measuring a water-absorbent resin by its predetermined property and/or its predetermined component content, wherein the water-absorbent resin comes being continuously produced via a classification step and/or a surface-modifying step; with the process involving a change of a production condition in accordance with results of the aforementioned measurement.

Yet another process according to the present invention for continuous production of a water-absorbent resin product comprises a step of measuring a water-absorbent resin by its particle diameters, wherein the water-absorbent resin comes being continuously produced via a classification step and/or a surface-modifying step; with the process being characterized in that the aforementioned particle diameters of the water-absorbent resin are measured by a laser diffraction scattering method.

A water-absorbent resin product, according to the present invention, is a water-absorbent resin product obtained by a process including the steps of: crosslink-polymerizing a monomer including acrylic acid and/or its salt; and then surface-crosslinking the resultant polymer with a dehydration-reactable crosslinking agent; with the water-absorbent resin product being characterized by satisfying the following:

(1) a mass-average particle diameter in the range of 300 to 600 μm;

(2) a residual monomer content of not higher than 500 ppm;

(3) an average value of not less than 25 g/g and a standard deviation of 0 to 0.50 as to an absorption capacity which is measured in a number "n" of analyzed samples=3 without load;

(4) an average value of not less than 20 g/g and a standard deviation of 0 to 0.35 as to an absorption capacity which is measured in a number "n" of analyzed samples=3 under a load of 1.9 kPa or 4.9 kPa; and (5) an average value of less than 5.0 mass % and a standard deviation of 0 to 0.50 as to a fine powder (smaller than 150 μm) content which is measured in a number "n" of analyzed samples=3.

These and other objects and the advantages of the present invention will be more fully apparent from the following detailed disclosure.

DETAILED DESCRIPTION OF THE INVENTION

Figure 1:
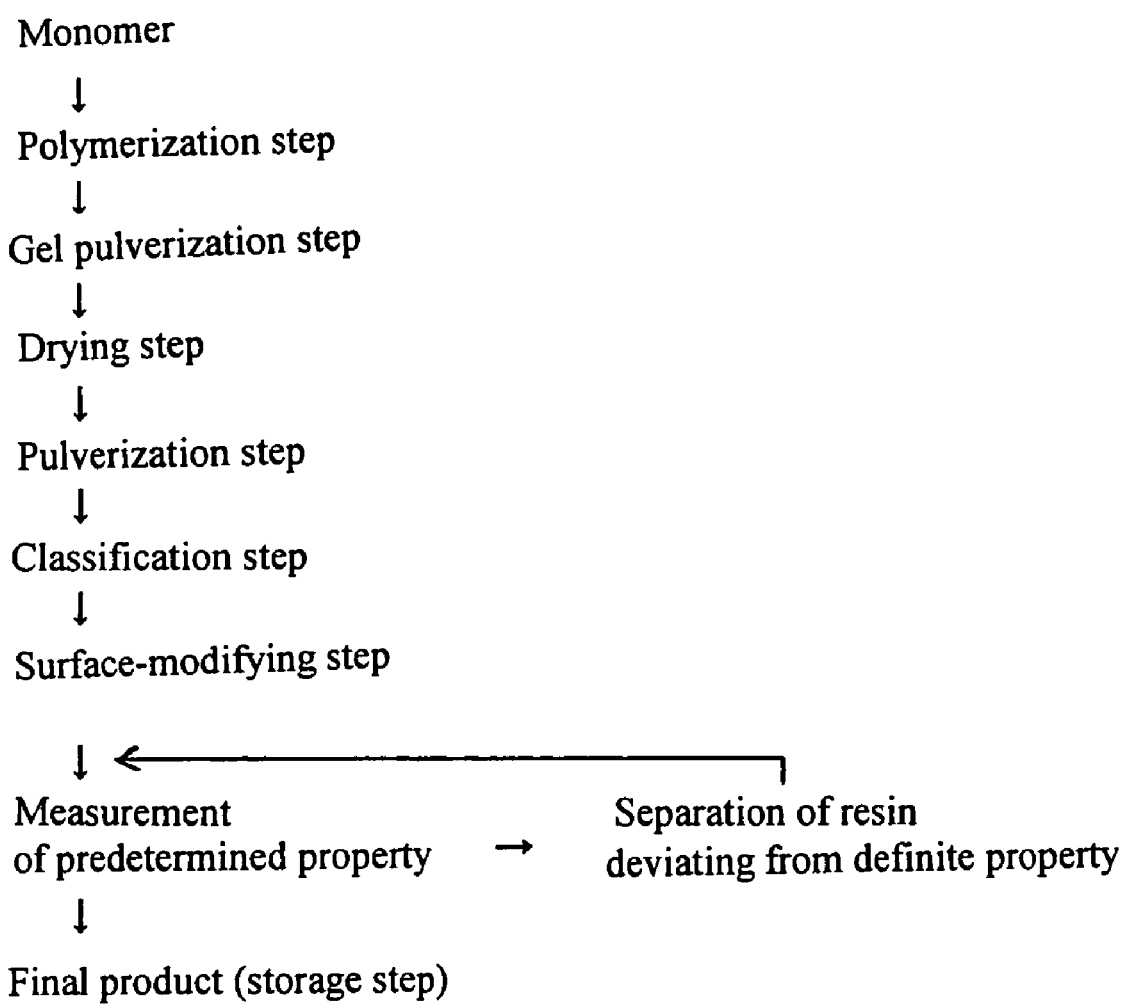
FIG. 1 is a flow chart which illustrates an example of modes for carrying out the production process according to the present invention.

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

[Continuous Production of Water-absorbent Resin Product]:

The process according to the present invention for production of a water-absorbent resin product is a process in which a crosslinked hydrogel polymer obtained from a polymerization step is dried in a drying step, and then, if necessary, pulverized in a pulverization step, and then processed by a classification step and/or a surface-modifying step, whereby the water-absorbent resin product is continuously produced. In addition, this process further comprises a transportation step and/or a storage step, if necessary.

Incidentally, as to the "continuous production" in the present invention, all steps don't need to be continuous steps. If, even though batch steps such as of polymerization and surface treatment are included, they are substantially linked so as to be a series of continuous flows, then the production is regarded as continuous. In the case where the batch steps are included in the present invention, it will do if such as a storage hopper is intermediately set appropriately for the linkage of these batch steps as the need arises.

The process according to the present invention for continuous production of a water-absorbent resin product is used favorably for continuous production of a water-absorbent resin product on a plant scale in the industrial production and is favorably applied to the continuous production on a gigantic scale of not less than 5 t (metric tons)/day, more favorably not less than 10 t/day, particularly favorably not less than 20 t/day, in yield of the water-absorbent resin product per line. In addition, although not especially limited, the upper limit of the above yield is, usually, favorably not more than 1,000 t/day, more favorably not more than 500 t/day. Incidentally, hereinafter, unless otherwise noted, the unit "t" of the weight or mass denotes the metric ton, and the weight and the mass are treated as the same meaning.

(Polymerization Step):

In the present invention, the water-absorbent resin refers to a conventional publicly known water-swellable crosslinked polymer which is a water-swellable and substantially water-insoluble crosslinked polymer and is formable into an anionic, nonionic, or cationic substantially water-insoluble hydrogel. In the present invention, the term "water-swellable" means being able to absorb water in a large amount of essentially not smaller than 5 times, favorably in the range of 50 to 1,000 times, of the own weight in ion-exchanged water. In addition, in the present invention, the term "substantially water-insoluble" means that the water-extractable component content (water-soluble polymer content) of the water-absorbent resin is in the range of 0 to 50 mass %, favorably not higher than 25 mass %, more favorably not higher than 20 mass %, still more favorably not higher than 15 mass %, particularly favorably not higher than 10 mass %.

In the present invention, as to the water-absorbent resin, one kind of water-absorbent resin or a mixture of water-absorbent resins is used. Favorable above all among them is an acid-group-containing water-absorbent resin, and more favorable is one kind of carboxyl-group-containing water-absorbent resin (which is a carboxylic acid or its salt) or a mixture of such resins. Typically, it is favorable that the main component of the water-absorbent resin is a crosslinked polymer which is obtained by a process including the step of crosslink-polymerizing a monomer including acrylic acid and/or its salt (neutralized material) as the main component, for example, a crosslinked poly(acrylic acid) salt polymer which contains a grafted component if necessary.

In the present invention, the water-absorbent resin favorably contains, as its constitutional units, acrylic acid in the range of 0 to 50 mol % and an acrylic acid salt in the range of 100 to 50 mol % (wherein the total of both is not more than 100 mol %), more favorably, acrylic acid in the range of 10 to 40 mol % and an acrylic acid salt in the range of 90 to 60 mol % (wherein the total of both is not more than 100 mol %). Incidentally, the molar ratio between these acid and salt (ratio of the salt to the total molar amount of the acid and salt) is referred to as neutralization degree.

The neutralization of the water-absorbent resin for forming the above salt may be carried out in a monomer state before the polymerization, or may be carried out in a polymer state on the way of or after the polymerization, or may be carried out both in these states. As examples of the neutralized salt, there can be cited such as: alkaline metal (e.g. sodium, potassium, lithium) salts, ammonium salts, and amine salts of (poly)acrylic acid.

In addition, favorably from the viewpoint of property stabilization, residual monomer content reduction, polymerization promotion or low color, the acrylic acid usable in the present invention contains p-methoxyphenol (another name: hydroquinone monomethyl ether). Its content is favorably not higher than 200 mass ppm, more favorably in the range of 10 to 160 mass ppm, still more favorably 20 to 140 mass ppm, yet still more favorably 30 to 120 mass ppm, yet still more favorably 40 to 100 mass ppm, yet still more favorably 50 to 90 mass ppm, relative to the acrylic acid. In addition, the protoanemonin content and/or the furfural content in the acrylic acid usable in the present invention is favorably in the range of 0 to 20 mass ppm, more favorably 0 to 10 mass ppm, particularly favorably 0 to 5 mass ppm.

The monomer for obtaining the water-absorbent resin in the present invention may be substantially only the acrylic acid (salt). Or an unsaturated monomer other than the above acrylic acid (salt) may be used to obtain the water-absorbent resin. In addition, the above other unsaturated monomer may be used jointly with the acrylic acid (salt) to obtain the water-absorbent resin. There is no especial limitation on the monomer other than the acrylic acid (salt). However, specific examples thereof include: anionic unsaturated monomers (e.g. methacrylic acid, maleic acid, vinylsulfonic acid, styrenesulfonic acid, 2-(meth)acrylamido-2-methylpropanesulfonic acid, 2-(meth)acryloylethanesulfonic acid, 2-(meth)acryloylpropanesulfonic acid) and their salts; nonionic-hydrophilic-group-containing unsaturated monomers (e.g. acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl (meth)acrylate, 2-hydroxypropyl (meth)acrylate, methoxypolyethylene glycol (meth)acrylate, polyethylene glycol mono(meth)acrylate, vinylpyridine, N-vinylpyrrolidone, N-acryloylpiperidine, N-acryloylpyrrolidine, N-vinylacetamide); and cationic unsaturated monomers (e.g. N,N-dimethylaminoethyl (meth)acrylate, N,N-diethylaminoethyl (meth)acrylate, N,N-dimethylaminopropyl (meth)acrylate, N,N-dimethylaminopropyl(meth)acrylamide, and their quaternary salts). These monomers may be used either alone respectively or in appropriate combinations with each other.

In the present invention, it is enough from the viewpoint of properties that the acrylic acid and its salt are used as the main components and, if necessary, jointly therewith another monomer is further used usually in an amount of favorably 0 to 30 mol %, more favorably 0 to 10 mol %, of the entire monomers.

When the above monomer is polymerized in order to obtain the water-absorbent resin in the present invention, it is possible to carry out bulk polymerization or precipitation polymerization. However, from the viewpoints of the performance, the facility of polymerization control, and further the absorption properties of a swollen gel, it is favorable to carry out aqueous solution polymerization or reversed-phase suspension polymerization in which the above monomer is used in the form of an aqueous solution, and it is more favorable to carry out the aqueous solution polymerization which is suitable for continuous polymerization. Incidentally, in the case where the above monomer is used in the form of an aqueous solution, the concentration of the monomer in this aqueous solution (hereinafter referred to as aqueous monomer solution) depends on the temperature of the aqueous solution or the kind of the monomer and is therefore not especially limited. However, this concentration is favorably in the range of 10 to 70 mass %, more favorably 20 to 60 mass %. In addition, when the above aqueous solution polymerization is carried out, a solvent other than water may be used jointly therewith if necessary. The kind of this solvent which is jointly used is not especially limited.

The method for the aqueous solution polymerization is not especially limited. However, examples thereof include: a method in which the aqueous monomer solution is polymerized while the resulting crosslinked hydrogel polymer is crushed in a kneader such as a single-shaft type or a multi-arm type (favorably, a twin-arm type) (kneader polymerization); and a method in which the aqueous monomer solution is supplied into a predetermined container or onto a moving belt to carry out the polymerization (belt polymerization) and then the resultant gel is pulverized with such as a meat chopper. For the purpose of most exercising the effects of the present invention, such kneader polymerization and belt polymerization are favorably applicable, and, particularly, continuous ones of these polymerizations are most favorably used.

When the above polymerization is initiated, there can be used, for example, the following: radical polymerization initiators such as potassium persulfate, ammonium persulfate, sodium persulfate, t-butyl hydroperoxide, hydrogen peroxide, and 2,2'-azobis(2-amidinopropane) dihydrochloride; and photoinitiators such as 2-hydroxy-2-methyl-1-phenyl-propan-1-one and 1-hydroxycyclohexyl phenyl ketone. Furthermore, a redox initiator is also available by using the above polymerization initiator jointly with a reducing agent which promotes the decomposition of the above polymerization initiator and thus combining both with each other. Examples of the above reducing agent include: (bi)sulfurous acid (salts) such as sodium sulfite and sodium hydrogensulfite; L-ascorbic acid (salts); reducible metals (salts) such as ferrous salts; and amines. However, there is no especial limitation thereto. From the viewpoint of properties such as residual monomer content and water absorption properties, the amount of the polymerization initiator as used is favorably in the range of 0.001 to 2 mol % (relative to the monomer), more favorably 0.01 to 0.1 mol % (relative to the monomer).

In addition, the initiation of the polymerization reaction may be carried out by irradiating the reaction system with active energy rays such as radiations, electron rays, and ultraviolet rays. Furthermore, the above polymerization initiator may be used jointly therewith. Incidentally, the reaction temperature in the above polymerization reaction is not especially limited. However, the temperature range of from the minimum temperature to the maximum temperature (peak temperature) of the polymerization reaction is favorably in the range of 15 to 130° C., more favorably 20 to 120° C. In addition, the reaction duration or polymerization pressure is also not especially limited, but may be set appropriately for such as the kind of the monomer or polymerization initiator and the reaction temperature.

The water-absorbent resin in the present invention has a crosslinked structure in its inside (what is called internal crosslinking).

The aforementioned internal crosslinking may be formed without any crosslinking agent (self-crosslinking type), but is preferably formed by copolymerization or reaction with a crosslinking agent (internal-crosslinking agent) having at least two polymerizable unsaturated groups or at least two reactive groups per molecule.

Specific examples of these internal-crosslinking agents include N,N'-methylenebis(meth)acrylamide, (poly)ethylene glycol di(meth)acrylate, (poly)propylene glycol di(meth)acrylate, trimethylolpropane tri(meth)acrylate, glycerol tri(meth)acrylate, glycerol acrylate methacrylate, ethylene-oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, and glycidyl (meth)acrylate.

These internal-crosslinking agents may be used either alone respectively or in appropriate combinations with each other. In addition, these internal-crosslinking agents may be added to the reaction system either in a lump or divisionally.

In the case where at least one or two or more kinds of internal-crosslinking agents are used, it is favorable, in consideration of such as absorption properties of the finally obtained water-absorbent resin product, that a compound having at least two polymerizable unsaturated groups is essentially used during the polymerization.

From the viewpoint of properties, the amount of these internal-crosslinking agents as used is favorably in the range of 0.001 to 2 mol %, more favorably 0.005 to 0.5 mol %, still more favorably 0.01 to 0.2 mol %, particularly favorably 0.03 to 0.15 mol %, relative to the aforementioned monomer (exclusive of the crosslinking agents).

In the case where the above internal-crosslinking agent is used to introduce the crosslinked structure into the inside of the water-absorbent resin, it is enough that the above internal-crosslinking agent is, for example, added to the reaction system before, on the way of, or after the polymerization of the above monomer, or after its neutralization.

Incidentally, when the above polymerization is carried out, to the reaction system there can be added such as: hydrophilic polymers (e.g. starch, cellulose, starch derivatives, cellulose derivatives, polyvinyl alcohol, poly(acrylic acid) (salts), and crosslinked poly(acrylic acid) (salts)) in an amount of 0 to 50 mass % (relative to the monomer); and others (e.g. various foaming agents such as (hydrogen) carbonates, carbon dioxide, azo compounds, and inert organic solvents; various surfactants; chelating agents; chain transfer agents such as hypophosphorous acid (salts)) in an amount of 0 to 10 mass % (relative to the monomer).

In the present invention, the water-absorbent resin is favorably produced by the reversed-phase suspension polymerization or the aqueous solution polymerization, particularly favorably by the aqueous solution polymerization. Incidentally, the reversed-phase suspension polymerization is a polymerization method in which the aqueous monomer solution is suspended in a hydrophobic organic solvent, and such a polymerization method is, for example, disclosed in US patents such as U.S. Pat. Nos. 4,093,776, 4,367,323, 4,446,261, 4,683,274, and 5,244,735. The aqueous solution polymerization is a polymerization method in which the aqueous monomer solution is polymerized without any dispersing solvent, and such a polymerization method is, for example, disclosed in: US patents such as U.S. Pat. Nos. 4,625,001, 4,873,299, 4,286,082, 4,973,632, 4,985,518, 5,124,416, 5,250,640, 5,264,495, 5,145,906, and 5,380,808; European patents such as EP 0811636, EP 0955086, and EP 0922717; and international publications such as WO 01/16197. In addition, polymerization conditions, which are disclosed in such as the aforementioned patent documents as cited in the explanation of prior arts herein, are also favorably applicable to the present invention.

(Drying Step):

The crosslinked hydrogel polymer, which is obtained from the above polymerization step, is formed into a water-absorbent resin having an aimed water content by the drying step. From the viewpoints of the coloring reduction and the residual monomer content reduction, the drying is initiated (the placement into a dryer is carried out) favorably within 2 hours, more favorably within 1 hour, still more favorably within 0.5 hour, particularly favorably within 0.2 hour, after the end of the polymerization (after the discharge from a polymerization machine).

The drying is carried out in the temperature range of usually 60 to 250° C., favorably 100 to 220° C., more favorably 120 to 200° C. The drying duration depends on such as the surface area and water content of the polymer and the kind of the dryer and is selected for the water content to be an aimed one. However, from the viewpoint of properties such as the residual monomer content reduction, hot-air-drying is carried out favorably with hot air containing water vapor and having a dew point of 50 to 100° C. (more favorably with hot air containing water vapor and having a dew point of 60 to 90° C.) favorably for 0.1 to 5 hours.

The water content of the water-absorbent resin (defined as the amount of water contained in the water-absorbent resin/measured by the drying loss at 180° C. in 3 hours) in the present invention is not especially limited. However, from the viewpoint of properties of the resulting water-absorbent resin product, the water content is favorably such that the water-absorbent resin can be a powder which is flowable even at room temperature, and is more favorably such that the water-absorbent resin can be in a powder state having a water content of 0.2 to 30 mass %, still more favorably 0.3 to 15 mass %, particularly favorably 0.5 to 10 mass %.

(Pulverization Step):

The production process according to the present invention may, if necessary, include the pulverization step of carrying out the pulverization with a pulverization machine to form a particulate water-absorbent resin after having dried the crosslinked hydrogel polymer (as obtained from the polymerization step) in the above drying step. Particularly in the case where the aqueous solution polymerization is carried out in the polymerization step, the pulverization step is favorably included.

Examples of the pulverization machine, as used in this pulverization step, include roller mills, knife mills, hammer mills, pin mills, and jet mills. The pulverization machine may be provided with a means of heating the inner surface of the pulverization machine itself.

There may be a case where it is possible to also use a gelled polymer as obtained without carrying out the pulverization or a dried material of this gelled polymer, namely, such as has a mass-average particle diameter of larger than 1,000 μm. However, in the case where the aqueous solution polymerization is carried out in the polymerization step, it is generally favorable that the polymer is powdered by the pulverization step.

Examples of the shape of water-absorbent resin particles, as obtained in the above way, include spherical shape, pulverized shape, and irregular shape without being especially limited. However, the irregular pulverized shape as obtained via the pulverization step is favorably usable.

(Classification Step):

In the present invention, favorably, the water-absorbent resin is adjusted to powder particle diameters according to the purpose by further carrying out the classification in the classification step. The classification step is favorably involved after the drying step, more favorably after the pulverization step. In addition, in the case where the surface-modifying step is included, the classification step is favorably involved before the surface-modifying step and, more favorably, a second classification step is also involved after the surface-modifying step.

The particle diameters of the water-absorbent resin obtained in the present invention are favorably in the range of 200 to 700 μm, more favorably 300 to 600 μm, particularly favorably 400 to 500 μm, in terms of mass-average particle diameter either after the classification or as the final product.

A favorable one of the water-absorbent resins obtained in the present invention contains a water-absorbent resin powder of 850 to 150 μm (which passes through a standard sieve of 850 μm and does not pass through a standard sieve of 150 μm/wherein the standard sieves are JIS-standardized articles or their correspondents) in an amount of 95 to 100 mass % either after the classification or as the final product. In the water-absorbent resin obtained in the present invention, the fine powder (e.g. favorably smaller than 100 μm, more favorably smaller than 150 μm) content is favorably low, specifically less than 5.0 mass %, more favorably less than 3.0 mass %, particularly favorably less than 1.0 mass %. Besides, in the water-absorbent resin obtained in the present invention, the coarse particles (e.g. favorably substantially not smaller than 1,000-μm-sieve, more favorably not smaller than 850-μm-sieve) content is favorably low, specifically not more than 5.0 mass %, more favorably not more than 1.0 mass %.

(Surface-modifying Step):

In the present invention, favorably, furthermore the surface-modifying is carried out by the surface-modifying step.

Examples of the surface-modifying of the water-absorbent resin include: (i) surface-crosslinking with a surface-crosslinking agent; (ii) surface-coating with water-insoluble fine particles; (iii) surface-coating with a surfactant; (iv) surface-coating with a hydrophilic or hydrophobic polymer; (v) surface-coating with a antibacterial agent or a deodorant; and (vi) surface-coating with an organic compound which is hydrophilic or hydrophobic. One or two or more of them are applied. However, favorably (i) surface-crosslinking with a surface-crosslinking agent and/or (ii) surface-coating with water-insoluble fine particles is applied, and most favorably these (i) and (ii) are jointly applied.

In consideration from property aspects, the amount of the surface-modifying agent (e.g. surface-crosslinking agent, water-insoluble fine particles) as used is favorably in the range of 0.001 to 10 mass parts, more favorably 0.01 to 8 mass parts, still more favorably 0.05 to 5 mass parts, most favorably 0.1 to 2 mass parts, per 100 mass parts of the water-absorbent resin (favorably, 100 mass parts of the water-absorbent resin which is a dried material).

The surface-crosslinking is an operation for modifying the properties of the water-absorbent resin by making the crosslinking density in surface neighborhood portions of water-absorbent resin particles higher than that inside them. Separately from the internal-crosslinking, various surface-crosslinking agents (second crosslinking agents to the internal-crosslinking agents) are added to the water-absorbent resin to thereby crosslink only its particle surfaces or surface layers.

The surface-crosslinking agent is not especially limited. However, such a crosslinking agent as reacts with the carboxyl group, particularly, a dehydration-reactable crosslinking agent, is favorably used. Hereupon, the term "dehydration-reactable" means that a dehydration reaction, favorably a dehydration esterification and/or a dehydration amidation, more favorably the dehydration esterification, takes place between a functional group (particularly that in surface neighborhood portions) of the water-absorbent resin reacts and the crosslinking agent. As to such a water-absorbent resin as surface-crosslinked by the dehydration esterification, its properties are high, but it has hitherto been difficult to control the reaction in the continuous production. The present invention is applied favorably for the purpose of solving such a problem and thereby stabilizing the properties.

In the case where the water-absorbent resin contains the carboxyl group, specific examples of such a dehydration-reactable crosslinking agent include: hydroxyl-group-containing crosslinking agents (e.g. polyhydric alcohols); amino-group-containing crosslinking agents (e.g.

polyamines); and cyclic crosslinking agents (e.g. alkylene carbonates, mono-, di-, or polyoxazolidinone compounds, oxetane compounds such as 3-methyl-3-oxetanemethanol) wherein the cyclic crosslinking agents produce the hydroxyl group or amino group with the progress of the ring-opening reactions of the cyclic crosslinking agents, and then this hydroxyl group or amino group makes the crosslinking reaction.

Still more specifically mentioning the dehydration-reactable crosslinking agent, its examples include: polyhydric alcohols (e.g. propylene glycol, 1,3-propanediol, 2-methyl-1,3-propanediol, glycerol, 1,4-butanediol, 1,5-pentanediol); alkylene carbonate compounds (e.g. 1,3-dioxolan-2-one, 4-methyl-1,3-dioxolan-2-one); and oxetane compounds (e.g. 3-methyl-3-oxetanemethanol) and polyoxetane compounds. For exercising the effects of the present invention at the maximum, it is favorable to use, of the above, at least one dehydration-reactable crosslinking agent selected from among the polyhydric alcohols, the alkylene carbonates, the oxazolidinone compounds, and the (poly)oxetane compounds, and it is particularly favorable to essentially use the polyhydric alcohols.

Examples of surface-crosslinking agents other than these dehydration-reactable crosslinking agents include non-dehydration-reactable crosslinking agents such as: epoxy compounds (e.g. ethylene glycol diglycidyl ether, γ-glycidoxypropyltrimethoxysilane); polyisocyanate compounds (e.g. 2,4-tolylene diisocyanate); polyoxazoline compounds (e.g. 1,2-ethylenebisoxazoline); silane coupling agents (e.g. γ-aminopropyltrimethoxysilane); polyaziridine compounds (e.g. 2,2-bishydroxymethylbutanol-tris[3-(1-aziridinyl) propionate]; and polyvalent metals (e.g. beryllium, magnesium, calcium, strontium, zinc, aluminum, iron, chromium, manganese, titanium, zirconium).

When the water-absorbent resin is mixed with the surface-crosslinking agent, then water and/or a hydrophilic organic solvent may be used.

The amount of water as used is favorably in the range of 0.1 to 10 mass parts, more favorably 0.5 to 8 mass parts, still more favorably 1 to 5 mass parts, per 100 mass parts of the water-absorbent resin (favorably, 100 mass parts of the water-absorbent resin which is a dried material).

Examples of the hydrophilic organic solvent include: alcohols (e.g. ethyl alcohol, propyl alcohol, isopropyl alcohol); ketones (e.g. acetone); ethers (e.g. dioxane, alkoxy (poly)ethylene glycols, tetrahydrofuran); amides (e.g. ε-caprolactam); and sulfoxides (e.g. dimethyl sulfoxide). The amount thereof as used is favorably in the range of 0 to 10 mass parts, more favorably 0 to 5 mass parts, still more favorably 0 to 3 mass parts, per 100 mass parts of the water-absorbent resin.

The method for mixing the surface-crosslinking agent is not especially limited. Accordingly, the water-absorbent resin may be mixed with such as water, the hydrophilic organic solvent, or an inorganic powder separately, or in a lump, or at several divided times. However, favorably, all of them are beforehand mixed together, and then the resultant mixture is added to the water-absorbent resin, wherein the mixture is, preferably, beforehand formed into an aqueous solution.

When the mixing is carried out, a water-insoluble fine particle powder or a surfactant may be made to coexist in the range not hindering the effects of the present invention, for example, in the range of 0 to 10 mass parts (relative to the water-absorbent resin).

A favorable one of the above various mixing methods is a method in which the surface-crosslinking agent and, if necessary, water and/or the hydrophilic organic solvent are dropwise added (more favorably, sprayed) to the water-absorbent resin to mix them together. The size of liquid droplets being sprayed is favorably in the range of 0.1 to 300 μm, more favorably 0.1 to 200 μm, in terms of average particle diameter. Hereupon, the temperature of the aqueous solution is favorably in the range of 0° C. to the boiling point, more favorably 5 to 50° C., still more favorably 10 to 30° C., from the viewpoints of the mixability and stability. The temperature of the water-absorbent resin powder, before its mixing, is favorably in the range of 0 to 80° C., more favorably 40 to 70° C., from the viewpoint of the mixability.

A favorable mixing apparatus as used for the aforementioned mixing is an apparatus which can generate great mixing power to ensure homogeneous mixing. Examples of such a mixing apparatus include cylinder type mixers, double-wall cone type mixers, high-speed stirring type mixers, V-character-shaped mixers, ribbon type mixers, screw type mixers, fluidized-furnace rotary disk type mixers, gas current type mixers, twin-arm kneaders, internal mixers, pulverizing type kneaders, rotary mixers, and screw type extruders. Favorably, the mixing is carried out in the high-speed stirring type mixers within 3 minutes. Particularly, the mixing is, favorably, continuous mixing.

In the case where the heating treatment is carried out in this step, the treatment duration is favorably in the range of 1 to 180 minutes, more favorably 3 to 120 minutes, particularly favorably 5 to 100 minutes. The heating treatment temperature (defined as the heating medium temperature or the material temperature) is favorably in the range of 100 to 250° C., more favorably 140 to 220° C., still more favorably 150 to 220° C., particularly favorably 160 to 220° C.

The above heating treatment can be carried out with conventional driers or heating furnaces. Examples of the driers include channel type mixing driers, rotary driers, disk driers, fluidized-bed driers, gas current type driers, and infrared driers.

In the surface-modifying step as favorably included in the production process according to the present invention, such as an inert surfactant, an inert deodorant, or an inert inorganic fine particle powder may be used in addition to the surface-crosslinking or without causing the surface-crosslinking, wherein the "inert" is inert in the meaning of substantially not reacting with the water-absorbent resin. As the surfactant and the inert inorganic fine particle powder as used in this case, favorably, there are used such as the below-mentioned superfine particles and inorganic fine particles, wherein the surface-crosslinking is also favorably carried out at the same time or separately.

A cationic polymer, which is used as an additive for the surface-modifying of the water-absorbent resin in the present invention, can enhance such as the fixability to sanitary materials, and favorably has a mass-average molecular weight of not less than 2,000, more favorably not less than 5,000, most favorably not less than 10,000. Incidentally, although not especially limited, the upper limit of the above mass-average molecular weight is favorably not more than 10,000,000, more favorably not more than 1,000,000, from property aspects. The amount of the cationic polymer as used is favorably in the range of 0.01 to 10 mass parts, more favorably 0.05 to 5 mass parts, still more favorably 0.1 to 3 mass parts, per 100 mass parts of the water-absorbent resin. When the cationic polymer is mixed, it is added alone or in the form of a solution (aqueous solution) and is favorably added after the surface-crosslinking. Specific examples of the cationic polymer include: polyethylenimine; polyvinylamine; polyallylamine; condensed products between polyamideamine and epichlorohydrin; polyamidine; partially hydrolyzed products from poly(N-vinylformamide); or their salts.

In the present invention, if water-insoluble fine particles are used as an additive, then the water-absorbent resin can be improved in such as the liquid permeability and the blocking resistance during the moisture absorption. As the water-insoluble fine particles, there are used inorganic or organic ones of favorably not larger than 10 µm, more favorably not larger than 1 µm, particularly favorably not larger than 0.1 µm, in mass-average particle diameter. Although not especially limited, usually, the lower limit of the above mass-average particle diameter is favorably not smaller than 0.1 nm. Specifically, there are used such as silicon oxide (e.g. trade name: Aerosil, produced by Nippon Aerosil Co., Ltd.), titanium oxide, and aluminum oxide. The mixing is carried out by powder mixing (Dry-Blend) or slurry mixing, wherein the amount as used is favorably not larger than 10 mass parts, more favorably in the range of 0.001 to 5 mass parts, still more favorably 0.01 to 2 mass parts, per 100 mass parts of the water-absorbent resin.

Incidentally, the above surface-crosslinking methods are disclosed also in: various European patents such as EP 0349240, EP 0605150, EP 0450923, EP 0812873, EP 0450924, and EP 0668080; various US patents such as U.S. Pat. Nos. 5,409,771, 5,597,873, 5,385,983, 5,610,220, 5,633,316, 5,674,633, and 5,462,972; and international publications such as WO 99/42494, WO 99/43720, and WO 99/42496. These surface-crosslinking methods are also applicable to the present invention.

In the present invention, additives may further be added apart from the surface-crosslinking as the surface treatment, if necessary. Specifically, there may be included an addition step for providing the water-absorbent resin with various functions, favorably a step of addition to surfaces, for example, a step of adding such as: deodorants; antibacterial agents; perfumes; foaming agents; pigments; dyes; hydrophilic short fibers; plasticizers; pressure-sensitive adhesives; surfactants; manure; oxidants; reducing agents; water; salts; chelating agents; fungicides; hydrophilic polymers (e.g. polyethylene glycol); paraffins; hydrophobic polymers; thermoplastic resins (e.g. polyethylene, polypropylene); and thermosetting resins (e.g. polyester resins, urea resins).

The amount of these additives as used is favorably in the range of 0 to 30 mass parts, more favorably 0 to 10 mass parts, still more favorably 0 to 1 mass part, per 100 mass parts of the water-absorbent resin. Incidentally, in the present invention, a water-absorbent resin which has been subjected to the surface-crosslinking and/or the addition of the additives is also generically referred to as water-absorbent resin in the range of including a water-absorbent resin as the main component and being substantially in a body. And the content of these additives is applied as what is measured in the step (A) of measuring the predetermined property and/or the predetermined component content in the present invention.

(Transportation Step):

The transportation step, which is included in the production process according to the present invention if necessary, links together the steps such as the polymerization step, the drying step, the pulverization step, the classification step, and the surface-modifying step. The transportation step is not needed for all linkages between the steps. However, there is favorably included at least a step of transporting a dried particulate water-absorbent resin with a transportation machine.

In the transportation step, the transportation is carried out in a continuous or batch manner, but favorably in a continuous manner. Examples of the transportation machine, as used in the transportation step, include those which are provided with a means of heating their inner surfaces from the outside and/or a means of heat-insulating the inner surfaces from the outside, such as a belt conveyor, a screw conveyor, a chain conveyor, a vibration conveyor, and a pneumatic conveyor. Of these transportation machines, the chain conveyor or pneumatic conveyor is favorably included.

As to the transportation step, favorably, at least a part thereof is carried out by pneumatic transportation. Not only for reducing the damage caused by the transportation of a high-property water-absorbent resin powder which is a dried material powder, but also for preventing the mingling of a metallic foreign substance, it is favorable that at least a part of the transportation step is carried out by the pneumatic transportation.

In this transportation step, favorably, the transportation machine is put in a state where inner surfaces of the transportation machine is heated and/or heat-insulated from the outside. Because such a way tends to be able to effectively prevent the cohesion in the transportation machine.

(Storage Step):

The production process according to the present invention may include the storage step of storing the above-mentioned dried particulate water-absorbent resin in a reservoir.

Examples of the reservoir, as used in this storage step, include a silo and a hopper, and favorable examples of the reservoir include those which are provided with a means of heating their inner surfaces, such as a silo and a hopper. For the particulate water-absorbent resin from the viewpoints of its abrasion property and electrification property, there is preferred a reservoir having a metallic inner surface, for example, an inner surface made of iron or stainless steel. In addition, the storage step (intermediate hopper) may be involved between the steps separately from the storage of the final product. The steps may be linked together by a buffering hopper and a rationing supply hopper in order to carry out the continuous production.

(Other Steps):

It is also favorable to irradiate a magnetic flux to the resultant water-absorbent resin, particularly, the final water-absorbent resin product. Such irradiation of the magnetic flux prevents the gel deterioration and gives a water-absorbent resin which is excellent in durability and contains substantially no metallic foreign substance. The magnetic flux density of the magnetic flux as used is favorably not less than 0.05 Wb/m$^2$ (500 gausses), more favorably not less than 0.5 Wb/m$^2$, particularly favorably not less than 1.0 Wb/m2. Favorably a permanent magnet and/or an electromagnet is used, and more favorably a magnet is arranged in the form of lattices to pass the water-absorbent resin through between them.

[Stabilization of Quality of Water-absorbent Resin Product]:

A process according to the present invention for continuous production of a water-absorbent resin product is characterized by comprising the following steps of: (A) measuring a water-absorbent resin by its predetermined property and/or its predetermined component content, wherein the water-absorbent resin comes being continuously produced via the classification step and/or the surface-modifying step; (B) separating a predetermined amount of water-absorbent resin (a) from the water-absorbent resin that comes being continuously produced, wherein the water-absorbent resin (a) is a water-absorbent resin which displays not less than a definite value and/or a water-absorbent resin which displays not more than a definite value as to the predetermined property and/or the predetermined component content in accordance with results of the aforementioned measurement; and (C) mixing at least a portion of the aforementioned separated predetermined amount of water-absorbent resin (a) into a water-absorbent resin that comes being continuously produced via the classification step and/or the surface-modifying step on the same or another production line.

Hereinafter, descriptions are given about these steps (A) to (C).

(Step (A)):

In the process according to the present invention for continuous production of a water-absorbent resin product, a water-absorbent resin is measured by its predetermined property and/or its predetermined component content, wherein the water-absorbent resin comes being continuously produced via the classification step and/or the surface-modifying step, favorably via the surface-modifying step.

The above water-absorbent resin, which comes being continuously produced via the classification step and/or the surface-modifying step, has no especial limitation, if this resin is a water-absorbent resin which has been subjected to the classification step and/or the surface-modifying step. Specifically, this resin refers to: a water-absorbent resin which exists on the production line at or after an outlet through which a classified and/or surface-modified water-absorbent resin is discharged from an apparatus or reactor in which the classification step and/or the surface-modifying step is carried out; or a water-absorbent resin product which is finally obtained.

That is to say, the water-absorbent resin which is measured by the aforementioned predetermined property may be either: a water-absorbent resin which exists on the production line at or after an outlet through which a classified and/or surface-modified water-absorbent resin is discharged from an apparatus or reactor in which the classification step and/or the surface-modifying step is carried out; or a water-absorbent resin product which is finally obtained. However, favorably from the viewpoint of such as easiness of the measurement, the above water-absorbent resin to be measured is the finally obtained water-absorbent resin product which exists in the final storage step of the continuous production line and/or just before this final storage step and/or in its periphery. Incidentally, in the case where the aforementioned predetermined property is measured as to the water-absorbent resin which exists on the production line at or after an outlet through which a classified and/or surface-modified water-absorbent resin is discharged from an apparatus or reactor in which the classification step and/or the surface-modifying step is carried out, then the place where the above measurement is carried out is not especially limited, but may be either: a place near the outlet through which a classified and/or surface-modified water-absorbent resin is discharged from an apparatus or reactor in which the classification step and/or the surface-modifying step is carried out; or a place near the terminal (outlet through which the resin is discharged as a product) of the production line.

The aforementioned measurement of the predetermined property and/or the predetermined component content may be continuous measurement or may be carried out by definite sampling every predetermined yield and/or every predetermined time. Hereupon, the phrase "every predetermined yield", for example, may refer to "every lot" or may refer to sampling inspection every yield in a lot. Incidentally, more specifically, for example, in the case where the final product is packed into a bag (or drum or container) every predetermined amount, the sampling inspection is carried out as to the corresponding product bag every predetermined yield and/or every predetermined time, or the sampling from a line flow of the lot of the final product is carried out every predetermined yield and/or every predetermined time. Incidentally, the size and definition of the lot are mentioned below.

The predetermined property and/or the predetermined component content, as aforementioned, has no especial limitation, if it is such a property or component content as influences the quality of the water-absorbent resin product. However, as examples thereof, there can be cited the publicly known or new properties or component contents including such as absorption capacity without load, absorption capacity under load, liquid permeability (liquid permeation amount), water content, pH, residual monomer content, bulk density, various component (e.g. additive) contents, gel strength, water-extractable component content, gas permeability, gel durability (e.g. light resistance, heat resistance, urine resistance, L-A resistance), deodorizability, antibacterial ability, and color difference. Their measurement methods are known also from the aforementioned various patents, the EDNA (European Disposable And Nonwoven Association), and the JIS (Japanese Industrial Standard). Of the above, what is favorable from the viewpoints of the stability of the properties and the degree of the influence exercised by the properties is at least one property (more favorably at least two properties, still more favorably at least three properties, particularly favorably at least four properties) selected from among: particle diameters (typified by the fine powder content); absorption capacity without load (typified by CRC); absorption capacity under load (typified by AAP or AUL); gel strength; and liquid permeability (liquid permeation amount).

Incidentally, the property or component content which is measured in the present invention is not limited by the methods as set forth in the Examples of some preferred embodiments of the present invention herein. Publicly known properties may be measured by publicly known measurement methods. In addition, improvements on these publicly known property measurement methods are also available, and quite new measurement methods are also available, and quite new properties or component contents are also available.

Examples of the method for measuring the particle diameters include sieve classification, gas flow classification, wet classification, and dry classification, without any especial limitation. The particle diameters may be measured by the weight (mass) or may be measured by the volume with such as laser. Particularly, it is one of preferred modes in the present invention that the particle diameters are measured by a laser diffraction scattering method.

That is to say, the present invention further provides a process for continuous production of a water-absorbent resin product which comprises a step of measuring a water-absorbent resin by its particle diameters, wherein the water-absorbent resin comes being continuously produced via a classification step and/or a surface-modifying step; with the process being characterized in that the aforementioned particle diameters of the water-absorbent resin are measured by a laser diffraction scattering method.

The laser diffraction scattering method is a method in which the light-scattering principle is utilized to measure the particle diameter distribution from a pattern of light scattering from particles which are suspended in a liquid (wet manner) or dry powdery particles (dry manner). The concentration of the particles in a sample is appropriately determined, but is favorably in the range of 1 to 90 mass %, more favorably 2 to 70 mass %. As to the measurement principle, it is favorable to use at least one method selected from among the Mie scattering method, Fraunhofer's analytic method, and a polarization differential scattering method (PIDS). In the case where the measurement is carried out in the wet manner, there is appropriately selected a non-absorbent solvent (non-aqueous solvent) which is transparent and has a low viscosity and is inert upon the water-absorbent resin. For example, lower alcohols (e.g. methanol, ethanol, propanol) and hydrocarbons (e.g. hexane) are used as dispersing solvents. In the case where the measurement is carried out in the dry manner, examples of favorable dispersing modes include free fall and, particularly, a tornado mode is favorable.

Examples of lasers favorable in the case of measuring the particle diameters by the laser diffraction scattering method include a single wave or a multiple wave, favorably a wavelength of 50 to 3,000 nm, more favorably a wavelength of 100 to 1,000 nm, still more favorably a wavelength of 350 to 900 nm, such as a diode laser (750 nm), tungsten halogen lamps (450 nm, 600 nm, 900 nm), and a red semiconductor laser (e.g. 690 nm). Incidentally, the laser diffraction scattering of the particle diameters may be measured in a batch manner by sampling a portion of the water-absorbent resin, or may be measured continuously with a laser diffraction scattering apparatus equipped on the way of the production line. In addition, the measurement may be either wet one or dry one. In the dry measurement, a water-absorbent resin powder may be made to freely fall, or the measurement may be a spray type. From the viewpoints of the precision for the water-absorbent resin and the application to the present invention, there is preferred the dry measurement. The measurement is favorably carried out under conditions of a temperature of 0 to 100° C. (more favorably 10 to 60° C.) and a relative humidity of 10 to 100% (more favorably 10 to 60%). Incidentally, in the case where the particle diameters are measured by the laser diffraction scattering method, it is general to determine the particle diameters by the volume (%). However, the determined particle diameters may appropriately be converted into mass (weight) % by comparison with the sieve classification. Incidentally, for the conversion of the particle diameters represented by the volume (%) into the mass (weight) %, it is enough that: the particle diameters are compared using a standard sample of a water-absorbent resin having the aimed property and/or the aimed component content, and then, based on its result, the conversion is carried out at a definite rate.

The particle diameters which are measured by the laser diffraction scattering method are, favorably, particle diameters of the water-absorbent resin product as the final product. Its property and/or its component content (e.g. absorption capacity without load, absorption capacity under load, liquid permeability, particle diameters) is high and controlled as mentioned below. For example, there is preferred a surface-crosslinked water-absorbent resin powder which contains a water-absorbent resin powder in an amount of 95 to 100 mass %, wherein the latter water-absorbent resin powder has a mass-average particle diameter in the range of 300 to 600 μm and is in the range of 850 to 150 μm (which passes through a standard sieve of 850 μm and does not pass through a standard sieve of 150 μm/wherein the standard sieves are JIS-standardized articles or their correspondents). In addition, the particle diameters (which may be either the particle diameters represented by the volume (%) or the particle diameters represented by the mass (weight) % as a result of the sieve conversion), as measured by the laser diffraction scattering method, of the water-absorbent resin and another property and/or component content of the water-absorbent resin are objects of the measurement of the predetermined property and/or the predetermined component content in the present invention, and further, may be used as test results and/or matters described in catalogues for showing the performances of the water-absorbent resin product as the final product.

When the absorption capacity without load, the absorption capacity under load, and the liquid permeability are measured as measurement other than the measurement of the particle diameters by the laser diffraction scattering method, then the particle diameters (specified as to the entirety of the water-absorbent resin or as to a specific particle diameter), the measurement temperature, the measurement time, and the liquid to be absorbed are appropriately selected. The liquid to be absorbed is, for example, not limited to ion-exchanged water or physiological saline solution, but is exemplified also by such as: sodium chloride solutions having various concentrations; synthetic or natural urine; blood; drained water; wastewater; seawater; and further, mixed water of organic solvents/water. They are used according to the purpose. In addition, the measurement temperature is also appropriately selected in the range of from higher than the solidifying point to not higher than the boiling point, but is controlled in the range as narrow as possible, favorably in the range of 0 to 50° C., more favorably 10 to 44° C., still more favorably 20 to 40° C. In addition, also as to the measurement time, the measurement may be carried out instantaneously in a continuous manner, or in a batch manner such that the measurement time is favorably within 16 hours, more favorably within 3 hours, still more favorably within 1 hour.

The measurement time does not need to reach the equilibrium or saturation. Such as a saturated value or a 1-hour value may be determined on the analogy of past empirical values by measurement in an extremely short time of about 1 second to about 10 minutes. In addition, the management may be carried out by a short-time value. Such measurement in a short time may be used to continuously measure the predetermined property and/or the predetermined component content on the way of a production flow of the water-absorbent resin, and thereafter the separation (e.g. separation on the line) of the water-absorbent resin may be carried out.

The absorption capacity without load in the present invention is a method in which the water-absorbent resin is freely swollen in a large excess of liquid that is to be absorbed. Known examples thereof include a CRC (Centrifuge Retention Capacity), a blue dextran method, and a TB (Tea Bag) method.

Known examples of the method for measuring the absorption capacity under load in the present invention include an AAP (Absorbency against Pressure), an AUL (Absorbency under load), and a demand method, according to such as various loads and various measurement concentrations.

Incidentally, when the water-absorbent resin (a), which is a water-absorbent resin that displays not less than a definite value and/or a water-absorbent resin that displays not more than a definite value as to the predetermined property and/or the predetermined component content, is determined, then the values of these predetermined property and/or predetermined component content will do if they are determined appropriately from the aimed properties of the water-absorbent resin.

The method for determining the aforementioned values of the predetermined property and/or the predetermined component content has no especial limitation. However, examples thereof include a method in which values deviating by predetermined values from the aimed values of the property and/or component content of the water-absorbent resin product which is desired to be finally obtained are adopted as the values of the predetermined property and/or the predetermined component content.

In addition, there is also a method in which: each of lots as produced in predetermined numbers is measured by the predetermined property and/or the predetermined component content, and thereafter lots having higher measured values (superordinate lots) are separated in predetermined numbers in the descending order as to the measured values, or lots having lower measured values (subordinate lots) are separated in predetermined numbers in the ascending order as to the measured values. Both the superordination and the subordination may be separated, or only either one of them may be separated. Preferable separation is separation of only the subordination. In addition, in the case of this method, the amount of the lots being separated is favorably in the range of 30 to 0.0001 mass %, more favorably 20 to 0.001 mass %, still more favorably 10 to 0.01 mass %, particularly favorably 5 to 0.05 mass %, as the superordination and/or the subordination, relative to the total amount of the lots as produced in predetermined numbers.

Specifically, for example, in the case where the object is to produce a water-absorbent resin which is in the predetermined ranges as to such as the absorption capacity without load, the absorption capacity under load, the liquid permeability, and the particle diameters, then it. is enough that: the absorption capacity without load, the absorption capacity under load, the liquid permeability, and the particle diameters deviating by predetermined values from the aimed values of the predetermined property and/or component content of the water-absorbent resin are beforehand determined, or a definite amount of the superordination or subordination is beforehand determined, and thereafter a water-absorbent resin which displays not less than or not more than the above-mentioned aimed values of the predetermined property and/or component content as the standards is fed to the step (B).

It is favorable that: such aimed property values of the water-absorbent resin product are used as the standards, and what has values deviating by definite values from those aimed property values is separated in the step (B).

Specific examples of the standards of the separation in the step (B) are determined appropriately for the aimed water-absorbent resin product and therefore cannot sweepingly be said. However, for example, as to the CRC, there is favorably separated what deviates from the range of 10 to 50 g/g, more favorably the range of 25 to 48 g/g, still more favorably the range of 28 to 45 g/g. As to the AAP under 1.9 kPa, there is favorably separated what deviates from the range of 20 to 40 g/g, more favorably the range of 30 to 38 g/g, still more favorably the range of 33 to 37 g/g. As to the AAP under 4.9 kPa, there is favorably separated what deviates from the range of 10 to 30 g/g, more favorably the range of 20 to 28 g/g, still more favorably the range of 23 to 27 g/g. As to the liquid permeability, there is favorably separated what deviates from the range of not longer than 360 seconds, more favorably the range of not longer than 240 seconds, still more favorably the range of 1 to 180 seconds, yet still more favorably the range of 2 to 120 seconds. As to the particle diameters, there is favorably separated what deviates from the range of 90 to 100 mass %, more favorably the range of 95 to 100 mass %, still more favorably the range of 98 to 100 mass %, as the water-absorbent resin powder content, wherein the water-absorbent resin powder has a mass-average particle diameter in the range of 300 to 600 μm and is in the range of 850 to 150 μm (which passes through a standard sieve of 850 μm and does not pass through a standard sieve of 150 μm). As to the particle diameters, also, there is favorably separated what deviates from the range of less than 10 mass %, more favorably the range of less than 5 mass %, still more favorably the range of less than 2 mass %, as the fine powder (smaller than 150 μm) content.

Incidentally, these properties may be measured by other measurement methods. For example, a water-absorbent resin product which displays a property of CRC=50 g/g displays a value corresponding to CRC=50 g/g in the case where the measurement is carried out by another measurement method.

Incidentally, regarding the CRC value as to the water absorption capacity without load and the AAP value as to the water absorption capacity under load in the present invention, the properties may be managed by other measurement methods. However, as things turn out, the properties of the water absorption capacity without load and the water absorption capacity under load are conceptions encompassing the ranges of the CRC and AAP which are referred to in the present invention.

In the case where the separation amount in the step (B) is too large, the lowering of the yield is brought about, and besides, the contribution to the stabilization of the properties is little for costs. In addition, in the case where the separation amount in the step (B) is too small, the contribution to the stabilization of the properties is little. Accordingly, in the production process according to the present invention, it is necessary that the values of the predetermined property and/or the predetermined component content which are needed for determining the water-absorbent resin (a) concerned in the step (B) are determined so that the separation amount in the step (B) may not be too large or too small.

In addition, the present invention further provides a process for continuous production of a water-absorbent resin product which comprises a step (A) of measuring a water-absorbent resin by its predetermined property and/or its predetermined component content, wherein the water-absorbent resin comes being continuously produced via a classification step and/or a surface-modifying step; with the process involving a change of a production condition in accordance with results of the aforementioned measurement.

In the present invention, favorably, the production condition is changed in accordance with the analyzed particle diameters. In addition, favorably, the measurement of the predetermined property and/or the predetermined component content, such as particle diameters, is carried out automatically and continuously, and a change of the programmed production condition (e.g. changes of conditions in the steps (B) and (C)) is carried out in accordance with results of the above measurement. The measurement of the temperature or flow rate has hitherto been carried out in the production of water-absorbent resins. However, in the present invention, a water-absorbent resin product having higher properties can be produced more stably with stable quality by measuring a water-absorbent resin by its predetermined property and/or its predetermined component content.

A favorable example of such a change of the production condition includes the below-mentioned separation in the step (B) and the below-mentioned mixing in the step (C).

For example, in the case where the production process according to the present invention includes the step of measuring the particle diameters of a water-absorbent resin by a laser diffraction scattering method, then a classification time of several tens of minutes by a batch analysis such as conventional sieve classification is not needed, but the particle diameters become determined instantaneously, automatically, and continuously. Therefore, monitoring can be carried out on the way of the production line to thus automatically or manually change the production condition at any time in accordance with the monitored particle diameter distribution. Accordingly, the production condition, which is changed in accordance with the above laser diffraction scattering of the particle diameters, will do if it depends on or relates to the particle diameters. Such as a change of conditions (e.g. temperature, amount) of the surface-modifying which depends on the regulation of the particle diameter distribution or on the particle diameters is applicable to the steps such as of pulverization, classification, and surface-treatment. Examples of methods for carrying out the monitoring on the way or at the end of the production line include: a method in which sampling is carried out automatically or manually in a batch manner; and a method in which the measurement is continuously carried out.

(Step (B)):

In the process according to the present invention for production of a water-absorbent resin product, there is included the step (B) of separating a predetermined amount of water-absorbent resin (a) from the water-absorbent resin that comes being continuously produced, wherein the water-absorbent resin (a) is a water-absorbent resin which displays not less than a definite value and/or a water-absorbent resin which displays not more than a definite value as to the predetermined property and/or the predetermined component content in accordance with results of the measurement in the aforementioned step (A).

As a specific mode, for example, in the case where the finally obtained water-absorbent resin product is measured by the predetermined property and/or the predetermined component content, a predetermined amount of water-absorbent resin (a) is separated from the water-absorbent resin product itself that comes being continuously produced, wherein the water-absorbent resin (a) is a water-absorbent resin which displays not less than a definite value and/or a water-absorbent resin which displays not more than a definite value as to the predetermined property and/or the predetermined component content.

In addition, in the case where the predetermined property and/or the predetermined component content is measured as to a water-absorbent resin which exists on the production line at or after an outlet through which a classified and/or surface-modified water-absorbent resin is discharged from an apparatus or reactor in which the classification step and/or the surface-modifying step is carried out, then the separation is carried out directly on the way of the flow, or a time when the water-absorbent resin, which is a water-absorbent resin that displays not less than a definite value and/or a water-absorbent resin that displays not more than a definite value as to the predetermined property and/or the predetermined component content, will come out of the terminal (outlet through which the resin is discharged as a product) of the production line is forecasted from such as transportation speed of the production line, and thereafter a water-absorbent resin product which is obtained at the corresponding time is separated. The separation may be carried out in a batch manner every container such that the resin is stored in a bag or tank as the final product such as every lot, or the separation may be carried out by letting the resin flow into one of two branches of a two-forked line after its continuous flowing in such as the below-mentioned continuous automatic measurement.

That is to say, a water-absorbent resin which is continuously flowing to each step or the final product in the continuous production may be continuously measured by the properties or particle diameters, and then only a water-absorbent resin not less than a definite standard may be made to continue flowing on the line from such as a two-forked line, when a water-absorbent resin less than the definite standard may be separated from the line. In addition, in the case where the separation is carried out in a batch manner, the separation will do if it is carried out with the water-absorbent resin left as it is stored in a container or with the water-absorbent resin got out of the container.

As a favorable method, the following sequence of operations will do: the particle diameters of the continuously flowing water-absorbent resin are continuously measured with a laser in a wet or dry manner, favorably in a dry manner, and then the particle diameters of less than a definite value (e.g. a water-absorbent resin containing a large amount of fine powder or a water-absorbent resin having a broad particle diameter distribution) are automatically separated from the line. Specifically, there is preferred a mode in which the particle diameters are measured by the laser diffraction scattering method and then, in interlock with the result of this measurement, the separation is automatically carried out.

(Step (C)):

In the process according to the present invention for production of a water-absorbent resin product, there is included the step (C) of mixing at least a portion of the predetermined amount of water-absorbent resin (a), as separated in the aforementioned step (B), into a water-absorbent resin that comes being continuously produced via a classification step and/or a surface-modifying step on the same or another production line.

Specifically, the entirety or at least a portion (favorably 50 to 100 mass %, more favorably 80 to 100 mass %, particularly favorably 95 to 100 mass %, of the separated amount) of the predetermined amount of water-absorbent resin (a), as separated in the aforementioned step (B), is mixed into: a water-absorbent resin which exists on the production line at or after an outlet through which a classified and/or surface-modified water-absorbent resin is discharged from an apparatus or reactor in which the classification step and/or the surface-modifying step is carried out; or a water-absorbent resin product which is finally obtained; on the same or another production line. Incidentally, the steps (B) and (C) are carried out when the occasion demands. Therefore, they may be carried out either in a batch manner or continuously. The transportation of the water-absorbent resin in the steps (B) and (C) may be linked together by the aforementioned transportation machine or, in the case of the batch manner, may be carried out every container or bag. Incidentally, the water-absorbent resin in the steps (B) and (C) is, during these steps, favorably mixed (more favorably mixed in a dry manner (mixing between powders)) as it is without being especially modified (e.g. surface-treated or granulated).

The mixing in the step (C) is carried out more favorably on the way of the production line and still more favorably in or after the pulverization step. Incidentally, the way of the production line refers to mixing the water-absorbent resin (a) into a usual flow (classification or transportation) of the continuous production substantially without newly setting a mixing apparatus for the step (C).

In the case where the water-absorbent resin (a) is mixed into a water-absorbent resin which exists on the production line at or after an outlet through which a classified and/or surface-modified water-absorbent resin is discharged from an apparatus or reactor in which the classification step and/or the surface-modifying step is carried out on the same or another production line, then it is enough that the water-absorbent resin (a) may be introduced into any place of such a production line. For example, this place may be either: a place near the outlet through which a classified and/or surface-modified water-absorbent resin is discharged from an apparatus or reactor in which the classification step and/or the surface-modifying step is carried out on the same or another production line; or a place near the terminal (outlet through which the resin is discharged as a product) of the production line.

In the case where the water-absorbent resin (a) is mixed into a water-absorbent resin product which is finally obtained, then the water-absorbent resin (a) is mixed into the water-absorbent resin product.

The mode of the mixing in the step (C) is not especially limited. However, for the purpose of enhancing the stabilization of the quality, it is favorable that the water-absorbent resin (a), which is a water-absorbent resin that displays not less than a definite value and/or a water-absorbent resin that displays not more than a definite value as to the predetermined property and/or the predetermined component content and has been separated in the aforementioned step (B), is continuously or intermittently added and mixed little by little. In the case where the water-absorbent resin (a) is added and mixed, the amount of this resin as added and mixed is favorably not larger than 10 mass %, more favorably in the range of 0.01 to 5 mass %, relative to the entirety.

The mixing of both is carried out favorably by wet mixing or dry mixing and more favorably by dry mixing. Various mixers, which are aforementioned as examples, are used. However, as another mode, it is also favorable to carry out the mixing by utilizing the flow of the powder in various transportation steps or classification steps in place of the mixers on the way of the water-absorbent resin production flow (favorably, after the surface treatment) without any mixer.

That is to say, for the purpose such that the water-absorbent resin product having high properties can continuously be produced easily and inexpensively with stable constant quality, it is favorable that the mixing in the step (C) is carried out on the way of the production line of the water-absorbent resin that comes being continuously produced via the classification step and/or the surface-modifying step.

In the present invention, the continuous production refers to continuously producing the water-absorbent resin product for not less than 24 hours per line or for not less than 1 day at a rate of 5 t (metric tons)/day. The production time is favorably not less than 10 days, more favorably not less than 100 days, and the yield per line is favorably not less than 20 t/day, more favorably not less than 50 t/day. As to the basic steps such as of polymerization, drying, pulverization, and surface-modifying in the process for production of the water-absorbent resin product, it does not matter whether these steps are continuous types or batch types in the continuous production system (for example, such as continuous polymerization and batch polymerization in the polymerization step). However, the interval between steps is favorably not more than 24 hours, more favorably not more than 12 hours, still more favorably not more than 6 hours, particularly favorably not more than 3 hours.

[Water-absorbent Resin Product Stable in Quality]:

By the production process according to the present invention, a water-absorbent resin product which is excellent in the properties such as absorption capacity without load, absorption capacity under load, liquid permeability, and particle diameters and is stable in quality can be obtained continuously with high productivity. In addition, if at least two water-absorbent resins are mixed together (favorably, mixed in a dry manner on the way of the production line), then it is also possible to adjust the product to any aimed property.

The properties of the water-absorbent resin product, which is obtained in the present invention, are favorably as follows: not less than 25.0 g/g as a CRC value as to the absorption capacity without load; not less than 20.0 g/g as an AAP value under 1.9 kPa or 4.9 kPa as to the absorption capacity under load; not longer than 240 seconds as to the liquid permeability; and further, 95 to 100 mass % as a water-absorbent resin powder (which has a mass-average particle diameter in the range of 300 to 600 μm and is in the range of 850 to 150 μm (which passes through a standard sieve of 850 μm and does not pass through a standard sieve of 150 μm)) content or less than 5 mass % as a fine powder (smaller than 150 μm) content as to the particle diameters (incidentally, as to the property value in the below-mentioned explanation, when its first decimal place is 0 like 25.0, then the decimal places are omitted like 25).

Incidentally, the CRC and the AAP under 1.9 kPa or 4.9 kPa are, merely, typical examples of methods for measuring the absorption capacity without load and the absorption capacity under load respectively. In the present invention, they do not need to be measured by such typical measurement methods, but may be another absorption capacity without load (e.g. TB method, dextran method, filtration method) and another absorption capacity under load (e.g. AUL, APUP).

The CRC of the water-absorbent resin product, which is obtained in the present invention, is more favorably in the range of 28 to 65 g/g, still more favorably 30 to 60 g/g, yet still more favorably 32 to 58 g/g, yet still more favorably 34 to 56 g/g, particularly favorably 36 to 54 g/g.

The AAP under 1.9 kPa or 4.9 kPa of the water-absorbent resin product, which is obtained in the present invention, is more favorably not less than 23 g/g, still more favorably not less than 25 g/g, particularly favorably not less than 27 g/g. Although not especially limited, the upper limit of the AAP under 1.9 kPa or 4.9 kPa of the water-absorbent resin product, which is obtained in the present invention, is favorably not more than 50 g/g.

The liquid permeability of the water-absorbent resin product, which is obtained in the present invention, is more favorably in the range of 1 to 180 seconds, still more favorably 2 to 120 seconds, particularly favorably 3 to 60 seconds.

The bulk density of the water-absorbent resin product, which is obtained in the present invention, is favorably in the range of 0.30 to 0.90, more favorably 0.50 to 0.80, still more favorably 0.60 to 0.75.

The particle diameters of the water-absorbent resin product, which is obtained in the present invention, are such that the water-absorbent resin product contains a water-absorbent resin powder in an amount of more favorably 97 to 100 mass %, still more favorably 99 to 100 mass %, wherein the water-absorbent resin powder has a mass-average particle diameter in the range of 300 to 600 μm and is in the range of 850 to 150 μm (which passes through a standard sieve of 850 μm and does not pass through a standard sieve of 150 μm), and also, the particle diameters of the water-absorbent resin product, which is obtained in the present invention, are such that the water-absorbent resin product has a fine powder (smaller than 150 μm) content of more favorably less than 3 mass %, still more favorably less than 1 mass % (incidentally, in the case where the particle diameters are measured by the volume by the laser diffraction scattering method, it is enough that the measured particle diameters are converted into mass (weight) % appropriately if necessary).

In addition, as is set out in the below-mentioned Examples of some preferred embodiments of the present invention and in the aforementioned object of the present invention, the water-absorbent resin product obtained in the present invention is of low color (also of no yellowness) and is low also in residual monomer content. Specifically, its colored state indicates favorably 0 to 15, more favorably 0 to 13, still more favorably 0 to 10, most favorably 0 to 5, in terms of YI value (Yellow Index/refer to EP 0942014 and EP 1108745), and there is almost no yellowness. Furthermore, the residual monomer content is favorably not higher than 500 ppm, more favorably not higher than 400 ppm, still more favorably not higher than 300 ppm, and its standard deviation is favorably not more than 30, more favorably not more than 20, still more favorably not more than 10.

In addition, the pH is favorably in the range of 4.0 to 9.0, more favorably 5.0 to 8.0.

For the purpose of making the properties of the water-absorbent resin product high and stabilizing them, there have hitherto been need of careful production and need to sacrifice the productivity. However, the present invention gives the high-property and stable water-absorbent resin product, which has never been so far, with high productivity. In addition, as is aforementioned, if the dehydration-reactable crosslinking agent is used for the surface-crosslinking, then the high properties can be obtained, and further, there is high safety. However, the reaction has hitherto been difficult to control, and therefore it has hitherto been difficult to stabilize the properties of the water-absorbent resin product. However, the present invention can stabilize the properties while keeping them high, and also exercises no influence upon the productivity or rather enhances it. Incidentally, in the case where the dehydration-reactable crosslinking agent is used in the present invention, the dehydration-reactable crosslinking agent may be made to act not as a crosslinking agent, but as a solvent (e.g. solvent for another crosslinking agent). However, it is usually favorable to make the dehydration-reactable crosslinking agent act as a surface-crosslinking agent when carrying out the surface-crosslinking by the heating treatment in the range of 160 to 220° C.

That is to say, the present invention provides a novel water-absorbent resin product which has high properties and is stable in quality.

The water-absorbent resin product, according to the present invention, is a water-absorbent resin product obtained by a process including the steps of:

crosslink-polymerizing a monomer including acrylic acid and/or its salt; and then surface-crosslinking the resultant polymer with a dehydration-reactable crosslinking agent;

with the water-absorbent resin product being characterized by satisfying the following:

(1) a mass-average particle diameter in the range of 300 to 600 μm;

(2) a residual monomer content of not higher than 500 ppm;

(3) an average value of not less than 25 g/g and a standard deviation of 0 to 0.50 as to an absorption capacity which is measured in a number "n" of analyzed samples=3 without load;

(4) an average value of not less than 20 g/g and a standard deviation of 0 to 0.35 as to an absorption capacity which is measured in a number "n" of analyzed samples=3 under a load of 1.9 kPa or 4.9 kPa; and (5) an average value of less than 5.0 mass % and a standard deviation of 0 to 0.50 as to a fine powder (smaller than 150 μm) content which is measured in a number "n" of analyzed samples=3.

Furthermore, it is favorable that the aforementioned dehydration-reactable crosslinking agent is a polyhydric alcohol.

Because the water-absorbent resin product, according to the present invention, has almost no dispersions in properties in the number "n" of analyzed samples=3 and further has high properties, this product gives very excellent performances, as have never been so far, also in practical use (e.g. use as actual diapers).

Hereupon, the number "n" of analyzed samples means that samples of "n" in number are arbitrarily extracted from the water-absorbent resin product to measure them by various properties. The larger the number "n" of analyzed samples is, the more precisely the dispersions in properties can be recognized. This "n" is favorably not smaller than 3, more favorably not smaller than 5, still more favorably not smaller than 10, particularly favorably not smaller than 20. Although not especially limited, usually, the upper limit value of the "n" is favorably not larger than 5,000, more favorably not larger than 1,000, still more favorably not larger than 500, particularly favorably not larger than 100.

The amount of one sample in the number "n" of analyzed samples depends on the form of the water-absorbent resin product and is therefore not especially limited. However, for example, in the case of the product in a water-absorbent resin production plant, the above amount is favorably not smaller than 1 kg, more favorably not smaller than 10 kg, still more favorably not smaller than 20 kg, yet still more favorably not smaller than 100 kg, particularly favorably not smaller than 500 kg, for example, as one lot. Although not especially limited, usually, the upper limit value of the above amount is favorably not larger than 500 t, more favorably not larger than 100 t, still more favorably not larger than 50 t, particularly favorably not larger than 25 t.

The mode to extract "n" samples to be analyzed is not especially limited. For example, in the case of the product in a water-absorbent resin production plant, examples of the extraction mode include: a mode in which "n" lots are extracted from the produced lots; and a mode in which "n" samples are extracted from one lot. As to commercially available products, in the case where they are commercially available in the form of water-absorbent resin products, examples of the extraction mode include: a mode in which "n" commercially available products are extracted from the produced lots; and a mode in which "n" samples are extracted from one identical lot of commercially available product. In the case of final products such as diapers, examples of the extraction mode include: a mode in which water-absorbent resin products are got out of "n" final products in the produced lots; and a mode in which "n" samples are extracted from a water-absorbent resin product as got out of one identical lot of final product. In the case where the lot is unclear in these commercially available products, for example, it is enough to extract "n"samples considering every sales unit as an identical lot. Incidentally, the unit of the extraction of "n" samples to be analyzed may be by the shipment container (e.g. bag) of the final product or may be by such as batch, hour, or day of the production.

Incidentally, in the case where the water-absorbent resin product is got out of the final product such as diaper to measure various properties, it is favorable to carry out the measurement after the water-absorbent resin product as got out of the final product has been dried (e.g. dried under reduced pressure at not higher than 50° C.) to such a degree as does not damage the water-absorbent resin product. The water absorption properties of the water-absorbent resin product depend on its water content. Immediately after having been produced, the water-absorbent resin product is in a state having its inherent water content and it is therefore enough to measure the water-absorbent resin product as it is. However, as to a water-absorbent resin product having absorbed moisture in the process of its distribution or use, it is favorable to carry out the measurement after having reduced the water content to a definite water content (which is defined as a water content resultant from drying at 180° C. for 3 hours and is favorably in the range of 1 to 8 mass %, more favorably 3 to 6 mass %) by drying.

The water-absorbent resin product, according to the present invention, displays the average value of not less than 25 g/g as to the absorption capacity which is measured in the number "n" of analyzed samples=3 without load. Such an average value is favorably in the range of 28 to 65 g/g, more favorably 30 to 60 g/g, still more favorably 32 to 58 g/g, yet still more favorably 34 to 56 g/g, particularly favorably 36 to 54 g/g.

The water-absorbent resin product, according to the present invention, displays the standard deviation of 0 to 0.50 as to the absorption capacity which is measured in the number "n" of analyzed samples=3 without load. Such a standard deviation is favorably in the range of 0 to 0.40, more favorably 0 to 0.30, still more favorably 0 to 0.20, particularly favorably 0 to 0.10.

The water-absorbent resin product, according to the present invention, displays the average value of not less than 20 g/g as to the absorption capacity which is measured in the number "n" of analyzed samples=3 under the load of 1.9 kPa or 4.9 kPa. Such an average value is favorably not less than 23 g/g, more favorably not less than 25 g/g, particularly favorably not less than 27 g/g. Although not especially limited, its upper limit is favorably not more than 50 g/g.

The water-absorbent resin product, according to the present invention, displays the standard deviation of 0 to 0.35 as to the absorption capacity which is measured in the number "n" of analyzed samples=3 under the load of 1.9 kPa or 4.9 kPa. Such a standard deviation is favorably in the range of 0 to 0.30, more favorably 0 to 0.20, still more favorably 0 to 0.10.

The water-absorbent resin product, according to the present invention, displays the average value of less than 5.0 mass % as to the fine powder (smaller than 150 μm) content which is measured in the number "n" of analyzed samples=3. Such an average value is favorably less than 3.0 mass %, more favorably less than 1.0 mass %.

The water-absorbent resin product, according to the present invention, displays the standard deviation of 0 to 0.50 as to the fine powder (smaller than 150 μm) content which is measured in the number "n" of analyzed samples=3. Such a standard deviation is favorably in the range of 0 to 0.40, more favorably 0 to 0.30, still more favorably 0 to 0.20, particularly favorably 0 to 0.10.

The water-absorbent resin product, according to the present invention, favorably displays an average value of not longer than 240 seconds, more favorably in the range of 1 to 180 seconds, still more favorably 2 to 120 seconds, particularly favorably 3 to 60 seconds, as to the liquid permeability which is measured in the number "n" of analyzed samples=3. In addition, the water-absorbent resin product, according to the present invention, favorably display a standard deviation of 0 to 10, more favorably 0 to 5, still more favorably 0 to 3, as to the liquid permeability which is measured in the number "n" of analyzed samples=3.

The water-absorbent resin product, according to the present invention, favorably has the aforementioned pH, the aforementioned bulk density, the aforementioned mass-average particle diameter, and the aforementioned residual monomer content. As to these properties, the standard deviation of the pH which is measured in the number "n" of analyzed samples=3 is favorably in the range of 0 to 0.01, and the standard deviation of the bulk density which is measured in the number "n" of analyzed samples=3 is favorably in the range of 0 to 0.01, and the standard deviation of the mass-average particle diameter which is measured in the number "n" of analyzed samples=3 is favorably in the range of 0 to 20, more favorably 0 to 10, and the standard deviation of the residual monomer content which is measured in the number "n" of analyzed samples=3 is favorably in the range of 0 to 20, more favorably 0 to 10.

In the present invention, the standard deviation indicates dispersions in various property values in the number "n" of analyzed samples. If the standard deviation comes in the above range, then a water-absorbent resin product of stable quality can be obtained. The numerical value of the number "n" of analyzed samples is favorably in the aforementioned range.

The standard deviations of such as CRC, AAP, liquid permeability, and particle diameters are specified by the following equation (1) and, for example, can be calculated also with commercially available calculation software (e.g. STDEV of Excel of Microsoft Corporation).

Standard deviations=standard deviations of properties in the number "n" of analyzed samples (1)

In addition, other properties of the water-absorbent resin product can also similarly be controlled in the present invention. For example, the coarse particle (not smaller than 850 μm) content can be controlled in the range of favorably 0 to 1.00, more favorably 0 to 0.50, still more favorably 0 to 0.20, in standard deviation. In addition, the properties, such as additive content, residual monomer content, coloring, pH, and water-extractable component content, can also stably be controlled.

In one of preferred modes for carrying out the present invention, the surface-modifying step is carried out in such a manner that the dehydration-reactable crosslinking agent, which has hitherto been difficult to control the properties, is used, more favorably thus carrying out dehydration esterification, still more favorably the polyhydric alcohol is used. That is to say, favorably, the present invention provides a novel production process in which the water-absorbent resin product is given the stability in property (the above standard deviation) by the above surface-crosslinking agent. Incidentally, such as favorable particle diameters, water-extractable component content, residual monomer content, and coloring of the water-absorbent resin product are in the above ranges, and a favorable monomer in the polymerization step includes acrylic acid and/or its salt as the main component.

[Uses of Water-absorbent Resin Product]:

The present invention makes it possible to easily produce a water-absorbent resin product having excellent properties which product is stable in quality without dispersion in quality when continuously produced. If different water-absorbent resins are mixed together, then a water-absorbent resin having any aimed property can be obtained. The water-absorbent resin product which is obtained in the present invention is widely used for such as agricultural and horticultural water-retaining agents, industrial water-retaining agents, moisture-absorbing agents, dehumidifying agents, and building materials. However, particularly favorably, this resin product is used for sanitary materials for absorption of excrement, urine, or blood which are represented by such as disposable diapers and sanitary napkins.

That is to say, the water-absorbent resin product which is obtained in the present invention has various properties that are excellent with good balance and stable. Therefore, for the sanitary materials for absorption, this resin product is usable in a high concentration as a water-absorbent resin concentration (mass ratio (weight ratio) of the water-absorbent resin to the total of the water-absorbent resin and fibrous materials), favorably in the range of 30 to 100 mass %, more favorably 40 to 100 mass %, still more favorably 50 to 95 mass %. In addition, the structure of a water-absorbent structure (absorption core) in the sanitary materials is not especially limited, if it is a structure as used for common water-absorbent articles. Examples thereof include: a water-absorbent structure of what is called sandwich structure such that the water-absorbent resin is arranged between hydrophilic fibrous materials as molded in the shape of sheets; and a water-absorbent structure of what is called blend structure such that a blend of the hydrophilic fibrous materials and the water-absorbent resin is molded.

(Effects and Advantages of the Invention):

In the present invention, a water-absorbent resin product having high properties can continuously be produced easily and inexpensively with stable constant quality.

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them in any way. Incidentally, hereinafter, for convenience, the unit "mass part(s)" may be referred to simply as "part(s)". In addition, the unit "mass %" may be referred to simply as "%".

(1) Absorption Capacity Without Load by CRC:

It was measured in accordance with EP 1153656 as follows. Specifically, 0.200 g of water-absorbent resin was uniformly placed into a nonwoven-fabric-made bag (60 mm×60 mm) and then immersed into a 0.9 mass % physiological saline solution of room temperature. After 30 minutes, the bag was pulled up and then drained of water at 250 G with a centrifugal separator for 3 minutes, and then the mass W1 (g) of the bag was measured. In addition, the same procedure as the above was carried out without the water-absorbent resin, and the resultant mass W0 (g) was measured. Then, the absorption capacity (g/g) without load by CRC was calculated from these W1 and W0 in accordance with the following equation:

Absorption capacity (g/g) without load by $CRC = (W1(g) - W0(g))/\text{mass (g) of water-absorbent resin}$ (2) Absorption Capacity Under Load by AAP:

It was measured in accordance with U.S. Pat. No. 5,140,076 as follows. Specifically, a stainless metal gauze (mesh opening size: 38 μm) was attached by fusion to a bottom of a plastic supporting cylinder of 60 mm in inner diameter. Then, onto the above gauze, there was uniformly spread 0.900 g of water-absorbent resin, and further thereon, there were mounted a piston and a load in sequence, wherein the piston had an outer diameter of only a little smaller than 60 mm and made no gap with the inner wall surface of the supporting cylinder, but was not hindered from moving up and down, and wherein the piston and the load were adjusted so that a load of 4.9 kPa could uniformly be applied to the water-absorbent resin. Then, the mass Wa (g) of the resultant one set of measurement apparatus was measured. A glass filter plate of 90 mm in diameter was mounted inside a Petri dish of 150 mm in diameter, and then a 0.90 mass % physiological saline solution (25° C.) was added up to the same level as the surface of the glass filter plate, on which a filter paper of 90 mm in diameter was then mounted so that its entire surface would be wetted, and further, an excess of liquid was removed. The above one set of measurement apparatus was mounted on the above wet filter paper, thereby allowing the water-absorbent resin to absorb the liquid under load. Then, 1 hour later, the one set of measurement apparatus was removed by being lifted to measure its mass Wb (g). Then, the absorption capacity (g/g) under load by AAP was calculated from the Wa and Wb in accordance with the following equation:

Absorption capacity (g/g) under load by $AAP = (Wa(g) - Wb(g))/\text{mass}((0.9)g)$ of water-absorbent resin.

(3) Water-extractable Component Content (Which May be Abbreviated to Extractable Component Content):

An amount of 500 mg of water-absorbent resin was dispersed into 1,000 ml of deionized water of room temperature and then stirred with a magnetic stirrer of 40 mm for 16 hours. Thereafter, the resultant swollen gel was filtered off with a filter paper (TOYO, No. 6). Next, a water-soluble polymer, which had eluted from the water-absorbent resin and was contained in the filtrate, was quantified by colloidal titration, thereby determining the mass % (relative to the water-absorbent resin) as the water-extractable component content in the water-absorbent resin.

(4) Residual Monomer Content:

In (3) above, a filtrate, as separately prepared after stirring for 2 hours, was UV-analyzed by liquid chromatography. Thereby, the residual monomer content of the water-absorbent resin (ppm/relative to the water-absorbent resin) was also analyzed.

(5) Particle Diameters and Mass-average Particle Diameter:

When the continuous measurement was carried out, the particle diameter distribution of the water-absorbent resin was measured in a free-fall type dry manner of water-absorbent resin powder with an infrared semiconductor laser (wavelength 690 nm, AC 100V).

In addition, as another method, 10.0 g of water-absorbent resin was placed onto JIS standard sieves (having mesh opening sizes of 850 μm, 600 μm, 500 μm, 300 μm, and 150 μm) (THE IIDA TESTING SIEVE: diameter=8 cm) under conditions of a room temperature (20 to 25° C.) and a humidity of 50 RH %, and then classified with a sieve shaker (IIDA SIEVE SHAKER, TYPE: ES-65 type, SER. No. 0501) for 10 minutes. The percentages of the residues on these sieves, R, were plotted on a logarithmic probability paper. Therefrom, the mass-average particle diameter (D50) was read.

(6) Evaluation of Coloring of Water-absorbent Resin (Hunter Whiteness Degree):

This was carried out in accordance with EP 0942014 and EP 1108745. Specifically, the evaluation of coloring of a water-absorbent resin powder was carried out in the following way using a spectroscopic color difference meter (SZ-Σ80 COLOR MEASURING SYSTEM, produced by Nippon Denshoku Kogyo Co., Ltd.). About 6 g of water-absorbent resin was filled into the below-mentioned powder-paste sample stand (filling of about 60% of this sample stand) to measure the surface color (Hunter whiteness degree (WB) and YI (Yellow Index)) of the water-absorbent resin using the above spectroscopic color difference meter under its set conditions (reflection measurement/appendix powder-paste sample stand (inner diameter: 30 mm)/standard round white board No. 2/30 mm φ projector pipe for powder-paste as the standard) under conditions of a room temperature (20 to 25° C.) and a humidity of 50 RH %. Incidentally, the larger WB and the smaller YI indicate that the coloring is lower and that the color is nearer to being substantially white.

(7) pH:

The pH of a dispersion (23±2° C.) of 100 mg of water-absorbent resin in 100 g of physiological saline solution was measured in accordance with U.S. Pat. No. 6,444,744.

(8) Liquid Permeability (Liquid Permeation Rate) Under Load:

An amount of 0.5 g of water-absorbent resin was measured by the liquid permeability for physiological saline solution (about 25 ml) under a load of 24.5 g/cm in accordance with U.S. Pat. No. 5,985,944. Incidentally, the increase of the liquid permeability under the load is favorable in that the liquid permeation rate (seconds) becomes shorter.

(9) Conversion of Volume-mass in Laser Diffraction Scattering Method:

The particle diameter distribution of the surface-crosslinked water-absorbent resin powder (1), as obtained from the below-mentioned Production Example 1, was measured by the volume by the laser diffraction scattering method every batch, and further, separately, the particle diameter distributions of 100 samples were measured by the mass by the sieve classification, thus obtaining a conversion equation between both (volume-mass). This conversion equation was used to convert the volume particle diameters, as measured by the laser diffraction scattering method, into the mass particle diameters (sieve particle diameters).

PRODUCTION EXAMPLE 1

As is shown in the flow chart of FIG. 1, a water-absorbent resin product was continuously produced by a process for continuous production of the water-absorbent resin product including the polymerization step, the drying step, the pulverization steps, the classification step, the surface-modifying step, the transportation steps, and the storage step by linking the apparatuses including a proportioning pump, a belt polymerization machine, a gel pulverization machine, a belt drier, a powder pulverization machine, a classification machine, a humidification machine (mixer for the surface-crosslinking agent), and a heating treatment machine through transportation machines. Its yield was 300 Kg/hr. The details are as follows.

(Polymerization Step):

As a monomer (1), there was prepared an aqueous solution of sodium acrylate of which the concentration was 41 mass % and of which 71 mol % of the acid groups were neutralized, wherein the solution contained polyethylene glycol diacrylate (molar-number-average degree "n" of addition polymerization of ethylene oxide=9) as an internal-crosslinking agent in an amount of 0.05 mol % (relative to the monomer). While kept at 20° C., the monomer (1) was continuously deaerated with nitrogen and then continuously mixed with sodium persulfate and L-ascorbic acid in amounts of 0.12 g/(mol of monomer) and 0.005 g/(mol of monomer) respectively both in the form of aqueous solutions. Instantaneously thereafter, the resultant mixture was continuously fed onto a nitrogen-sealed endless belt with the proportioning pump so as to be 20 mm thick. About 1 minute after, the polymerization started and, about 20 minutes after, the resultant crosslinked hydrogel polymer (1) was continuously discharged from the terminal of the moving belt.

(Drying Step):

Next, the crosslinked polymer (1) was continuously coarsely pulverized into the shape of particles of about 1 mm with a linked meat chopper, and then mounted on a perforated plate of a band drier so as to be 3 to 5 cm thick, and then continuously hot-air-dried for 30 minutes by passing hot air of 60° C. in dew point and 170° C. in temperature through the polymer upward and downward. As a result, a blocky dried polymer (1) was obtained at an outlet of the drier.

(Pulverization Step and Classification Step):

This dried polymer (1) was disintegrated at the same time as being got out. The resultant particulate dried material was pulverized by continuously supplying it to a three-stage roll granulator (roll setting gaps: 1.0 mm/0.55 mm/0.42 mm in order from the top) at 300 kg/hr. The resultant particulate water-absorbent resin powder of about 60° C. was continuously classified with a JIS standard sieve of 850 μm, thus obtaining a water-absorbent resin base polymer (1) of which not less than 90 mass % was the size of smaller than 850 μm, but not smaller than 150 μm.

(Surface-modifying Step):

Furthermore, the water-absorbent resin base polymer (1) was continuously supplied to a high-speed continuous mixer (turbilizer/1,000 rpm) to spraywise mix the polymer with an aqueous surface-crosslinking agent solution having a composition of 1,4-butanediol/propylene glycol/water/24% aqueous sodium hydroxide solution=0.39/0.62/3.39/0.3 (mass %/relative to the base polymer) by use of a spray which was to form liquid droplets of about 200 μm on average. Next, the resultant mixture (1) was continuously heat-treated at 195° C. with a paddle drier for 40 minutes, and then classified with a sieve classification apparatus having a sieve screen of 850 μm in mesh opening size (second classification step), and then stored, thus obtaining a surface-crosslinked water-absorbent resin powder (1).

PRODUCTION EXAMPLE 2

A crosslinked hydrogel polymer (2) was obtained in the same way as of the polymerization step of Production Example 1 except that the monomer (1) was replaced with a monomer (2) that was an aqueous solution of sodium acrylate of which the concentration was 38 mass % and of which 75 mol % of the acid groups were neutralized, wherein the solution contained trimethylolpropane triacrylate as an internal-crosslinking agent in an amount of 0.02 mol % (relative to the monomer). Thereafter, this polymer was dried, pulverized, and classified in the same way as of Production Example 1. Thereby a water-absorbent resin base polymer (2) was obtained.

The water-absorbent resin base polymer (2) was continuously supplied to a high-speed continuous mixer (turbilizer/

1,000 rpm) to spraywise mix the polymer with an aqueous surface-crosslinking agent solution having a composition of ethylene glycol diglycidyl ether/propylene glycol/water/isopropanol=0.1/0.9/3.9/0.5 (mass %/relative to the base polymer) by use of a spray which was to form liquid droplets of about 200 μm on average. Next, the resultant mixture (2) was continuously heat-treated at 195° C. with a paddle drier for 40 minutes, and then classified with a sieve classification apparatus having a sieve screen of 850 μm in mesh opening size (second classification step), and then stored, thus obtaining a surface-crosslinked water-absorbent resin powder (2).

PRODUCTION EXAMPLE 3

A water-absorbent resin powder (3) was obtained in the same way as of the continuous production of Production Example 2 except to make the following change of conditions.

Specifically, the aqueous surface-crosslinking agent solution, with which the water-absorbent resin base polymer (2) was mixed, was changed to such as had a composition of propylene glycol/water/isopropanol=0.5/2.0/0.5 (mass %/relative to the base polymer), and the resultant mixture (3) was heat-treated at 210° C. for 30 minutes, and then classified and stored in the same way, thus obtaining a surface-crosslinked water-absorbent resin powder (3).

COMPARATIVE EXAMPLE 1

In Production Example 1, the above process was carried out by 24-hour operation continuously for 2 weeks. The properties of the resultant water-absorbent resin were measured every 1 t (every about 3.3 hours), and the average values and standard deviations of the property values of lots of the resin were determined (number "n" of analyzed samples=about 100). The results are shown in Table 1.

COMPARATIVE EXAMPLE 2

In Production Example 2, the above process was carried out by 24-hour operation continuously for 2 weeks. The properties of the resultant water-absorbent resin were measured every 1 t (every about 3.3 hours), and the average values and standard deviations of the property values of lots of the resin were determined (number "n" of analyzed samples=about 100). The results are shown in Table 1.

EXAMPLE 1

Only superordinate 10% and subordinate 10% in AAP value of lots of the water-absorbent resin as obtained from Comparative Example 1 were separated in a batch manner. The separated superordinate 10% and subordinate 10% of the water-absorbent resin was mixed in a dry manner in an amount of 20% into a water-absorbent resin existing in the range of from after the surface-crosslinking to before the second classification step. Thereafter, the average values and standard deviations of the property values of the resultant mixture were determined. The results are shown in Table 1.

EXAMPLE 2

Only subordinate 10% in AAP value of lots of the water-absorbent resin as obtained from Comparative Example 1 were separated in a batch manner. The separated subordinate 10% of the water-absorbent resin was mixed in a dry manner in an amount of 10% into a water-absorbent resin existing in the range of from after the surface-crosslinking to before the second classification step. Thereafter, the average values and standard deviations of the property values of lots of the resultant mixture were determined. The results are shown in Table 1.

EXAMPLE 3

As to the particle diameters of the water-absorbent resin in Comparative Example 2, the particle diameter distribution of the water-absorbent resin freely falling from a line of before the final storage step was continuously measured in a dry manner with an infrared semiconductor laser (wavelength 690 nm). In the case where the fine powder content was higher than 2 mass %, the water-absorbent resin was separated into a second line automatically forking into two ways. The water-absorbent resin as separated in this way was mixed in a dry manner into a water-absorbent resin existing in the range of from after the surface-crosslinking to before the second classification step. Thereafter, the average values and standard deviations of the property values of lots of the resultant mixture were determined. The results are shown in Table 1.

EXAMPLE 4

Only subordinate 1% in liquid permeability under load of lots of the water-absorbent resin as obtained from Comparative Example 2 were separated in a batch manner. The separated subordinate 1% of the water-absorbent resin was mixed in a dry manner in an amount of 1% into a water-absorbent resin existing in the range of from after the surface-crosslinking to before the second classification step. Thereafter, the average values and standard deviations of the property values of lots of the resultant mixture were determined. The results are shown in Table 1.

COMPARATIVE EXAMPLE 3

In Production Example 3, the above process was carried out by 24-hour operation continuously for 2 weeks. The properties of the resultant water-absorbent resin were measured every 1 t (every about 3.3 hours), and the average values and standard deviations of the property values of lots of the resin were determined (number "n" of analyzed samples=about 100). The results are shown in Table 1.

EXAMPLE 5

Only subordinate 1% in liquid permeability under load of lots of the water-absorbent resin as obtained from Comparative Example 3 were separated in a batch manner. The separated subordinate 1% of the water-absorbent resin was mixed in a dry manner in an amount of 1% into a water-absorbent resin existing in the range of from after the surface-crosslinking to before the second classification step. Thereafter, the average values and standard deviations of the property values of lots of the resultant mixture were determined. The results are shown in Table 1.

EXAMPLE 6

Only subordinate 2% in CRC value of lots of the water-absorbent resin as obtained from Comparative Example 3 were separated in a batch manner. The separated subordinate 2% of the water-absorbent resin was mixed in a dry manner in an amount of 1% into a water-absorbent resin existing in the range of from after the surface-crosslinking to before the second classification step. Thereafter, the average values and standard deviations of the property values of lots of the resultant mixture were determined. The results are shown in Table 1.

TABLE 1

|  | CRC | | AAP | | Liquid permeability | | Fine powder (smaller than 150 μm) content | |
| --- | --- | --- | --- | --- | --- | --- | --- | --- |
|  | Average value (g/g) | Standard deviation | Average value (g/g) | Standard deviation | Average value (seconds) | Standard deviation | Average value (mass %) | Standard deviation |
| Comparative Example 1 | 30.3 | 1.04 | 24.9 | 1.03 | 120 | 10 | 3.3 | 1.1 |
| Example 1 | 30.3 | 0.09 | 24.9 | 0.10 | 120 | 5 | 3.3 | 0.3 |
| Example 2 | 30.3 | 0.18 | 24.9 | 0.18 | 180 | 20 | 3.3 | 0.5 |
| Comparative Example 2 | 29.4 | 1.01 | 25.0 | 1.05 | 180 | 6 | 1.7 | 1.1 |
| Example 3 | 29.4 | 0.36 | 25.0 | 0.36 | 180 | 20 | 1.7 | 0.2 |
| Example 4 | 30.3 | 0.29 | 24.9 | 0.31 | 180 | 10 | 3.3 | 0.5 |
| Comparative Example 3 | 29.0 | 1.13 | 24.0 | 1.15 | 220 | 20 | 1.6 | 1.1 |
| Example 5 | 29.0 | 0.31 | 24.0 | 0.29 | 220 | 8 | 1.6 | 0.4 |
| Example 6 | 29.0 | 0.29 | 24.0 | 0.27 | 220 | 6 | 1.6 | 0.3 |

The residual monomer content is 280 ppm on average (its standard deviation is 10 in the Examples).
The mass-average particle diameter is 430 μm on average (its standard deviation is 10 in the Examples).
The Y1 is 4.0 on average (its standard deviation is not more than 0.1 in Examples 1 to 3 and is 0.2 in Comparative Examples 1 to 2).
The pH is 6.0 on average (Examples 1 and 2, Comparative Example 1) or 6.1 on average (Examples 3 to 6, Comparative Examples 2 and 3) (its standard deviation is 0.0 in the Examples).
The bulk density is 0.68 on average (its standard deviation is 0.01 in the Examples).

The results of Examples 1 to 6 and Comparative Examples 1 to 3 are shown in Table 1. In the process according to the present invention, the standard deviations (s) of the properties are very small. Even if the productivity (cost) is not sacrificed for the property control as conventional, the properties can be stabilized very much even in the continuous production, or production of various kinds of products, on a gigantic scale in the present invention. In addition, in the present invention, there is also a case where the productivity is rather enhanced. In addition, the water absorption properties of sanitary materials (absorbent articles such as diapers) involving the use of the water-absorbent resin product obtained in the present invention can also be stabilized very much.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for continuous production of a water-absorbent resin product, wherein the water-absorbent resin comes being continuously produced via a classification step and a surface-modifying step following a step of polymerizing a monomer and a step of drying, wherein the water-absorbent resin has a mass-average particle diameter of 200 to 700 μm (according to JIS-standardized sieves) after the classification, and contains particles of not smaller than 1,000 μm (according to JIS-standardized sieves) in the range of less than 5.0 mass %,
which comprises the following steps of:

(A) measuring a water-absorbent resin by its predetermined property and/or its predetermined component content after the classification step and/or a surface-modifying step;

(B) separating a predetermined amount of water-absorbent resin (a) from the water-absorbent resin that comes being continuously produced, wherein the water-absorbent resin (a) is a water-absorbent resin which displays not less than a definite value and/or a water-absorbent resin which displays not more than a definite value as to the predetermined property and/or the predetermined component content in accordance with results of the aforementioned measurement; and (C) mixing at least a portion of the aforementioned separated predetermined amount of water-absorbent resin (a) into a water-absorbent resin that comes being continuously produced via a classification step and/or a surface-modifying step on the same or another production line, wherein the water-absorbent resin (a) is mixed without being substantially modified.

2. A process for continuous production of a water-absorbent resin product according to claim 1, wherein the mixing in the aforementioned step (C) is carried out on the way of the production line.

3. A process for continuous production of a water-absorbent resin product according to claim 1,
further comprising the step of changing a production condition in accordance with results of step (A).

4. A process for continuous production of a water-absorbent resin product according to claim 1, wherein the aforementioned water-absorbent resin which is measured by its predetermined property and/or its predetermined component content is a water-absorbent resin product that is finally obtained via the surface-modifying step.

5. A process for continuous production of a water-absorbent resin product according to claim 1, wherein the aforementioned predetermined property and/or the aforementioned predetermined component content is at least one member selected from the group consisting of absorption capacity without load, absorption capacity under load, liquid permeability, and particle diameters.

6. A process for continuous production of a water-absorbent resin product according to claim 5, wherein the particle diameters of the water-absorbent resin having a mass-average particle diameter of 300 to 600 μm and having particles of 850 to 150 μm (according to JIS-standardized sieve) in an amount of 95 to 100 mass % are measured by a laser diffraction scattering method.

7. A process for continuous production of a water-absorbent resin product according to claim 1, wherein the water-absorbent resin has particles of 850 to 150 μm (according to JIS-standardized sieve) in an amount of 95 to 100 mass %.

8. A process for continuous production of a water-absorbent resin product according to claim 1, wherein the mixing in step (C) is carried out in a dry manner.

9. A process for continuous production of a water-absorbent resin product according to claim 1, wherein the yield of the water-absorbent resin per line is not less than 20 t (metric tons)/day.

10. A process for continuous production of a water-absorbent resin product according to claim 1, wherein the water-absorbent resin contains a carboxyl group, and the surface-modifying step is carried out by dehydration-reactable crosslinking agent which can react with the carboxyl group by dehydration esterification and/or dehydration amidation.

11. A process for continuous production of a water-absorbent resin product according to claim 1, wherein the amount of the water-absorbent resin (a) separated in the step (B) and mixed to the water-absorbent resin is not larger than 10 mass % relative to the entirety.

12. A process for continuous production of a water-absorbent resin product according to claim 1, wherein the amount of water-absorbent resin (a) separated in the step (B) is 20 to 0.001 mass % relative to the total amount of the water-absorbent resin as produced.

13. A process for continuous production of a water-absorbent resin product according to claim 1, wherein the obtained water-absorbent resin satisfy the following:
  (1) a mass-average particle diameter of 300 to 600 μm;
  (2) a residual monomer content of not higher than 500 ppm;
  (3) an absorption capacity of not less than 25 g/g without load;
  (4) an absorption capacity of not less than 20 g/g under a load of 1.9 kPa or 4.9 kPa; and
  (5) a fine powder (smaller than 150 μm) content of less than 5.0 mass %.

14. A process for continuous production of a water-absorbent resin product according to claim 6, wherein the laser diffraction scattering method is carried out in the dry measurement.

15. A process for continuous production of a water-absorbent resin product according to claim 1, wherein the water-absorbent resin (a) in step (C) is mixed without surface treatment and/or granulation.

* * * * *